United States Patent
Schelhaas

(10) Patent No.: US 7,487,811 B2
(45) Date of Patent: Feb. 10, 2009

(54) SPOKE WHEEL RIM FOR TUBELESS TIRES

(75) Inventor: Clemens Schelhaas, Maria Schmolln (AT)

(73) Assignee: KTM Sportmotorcycle AG, Mattighofen (AT)

( * ) Notice: Subject to any disclaimer, the term of this patent is extended or adjusted under 35 U.S.C. 154(b) by 85 days.

(21) Appl. No.: 11/281,723

(22) Filed: Nov. 16, 2005

(65) Prior Publication Data

US 2006/0108041 A1 May 25, 2006

(30) Foreign Application Priority Data

Nov. 19, 2004 (DE) .................. 10 2004 055 892

(51) Int. Cl.
B60B 21/12 (2006.01)
B60B 25/22 (2006.01)

(52) U.S. Cl. .................. 152/381.5; 301/58; 301/95.101

(58) Field of Classification Search .................. 301/55, 301/58, 67, 95.104, 95.106; 152/381.5, 381.6, 152/400, DIG. 16, 513

See application file for complete search history.

(56) References Cited

U.S. PATENT DOCUMENTS 3,008,770 A * 11/1961 Mueller .................. 301/95.106
3,335,778 A 8/1967 Bladgen et al.
3,965,957 A * 6/1976 Nakasaki .................. 152/400
4,824,177 A 4/1989 Aloy
5,538,058 A * 7/1996 Aloy .................. 152/381.5
6,782,931 B2 * 8/2004 Koziatek .................. 152/502
7,104,300 B2 * 9/2006 Veux et al. .................. 152/379.4
2004/0095014 A1 * 5/2004 Veux et al. .................. 301/58

FOREIGN PATENT DOCUMENTS

| DE | 1002210 | 2/1957 |
|---|---|---|
| DE | 3878397 T2 | 6/1993 |
| DE | 29803256 U1 | 7/1998 |
| DE | 20316995 U1 | 2/2004 |
| EP | 0615865 A1 | 9/1994 |
| EP | 0616911 A2 | 9/1994 |
| EP | 0962338 A1 | 12/1999 |
| JP | 61054302 A | 3/1986 |
| JP | 09002005 A | 1/1997 |

* cited by examiner

*Primary Examiner*—Russell D Stormer
*Assistant Examiner*—Kip T Kotter
(74) *Attorney, Agent, or Firm*—Rod D. Baker

(57) ABSTRACT

A rim of a spoke wheel for tubeless tires including a sealing device (12, 25, 27, 36, 44, 46, 48) arranged in the region of a rim bed (2) in a well (11) of the rim (1) and the rim (1) comprising on both sides of a rim center plane (10) a relief (13) with sealing areas, the relief (13) being provided with two constrictions forming the sealing areas (14, 14') and the sealing device (12, 25, 27, 36, 44, 46, 48) being configured substantially complementary in shape and size to the relief (13) and is arranged therein.

47 Claims, 13 Drawing Sheets

SPOKE WHEEL RIM FOR TUBELESS TIRES

BACKGROUND OF THE INVENTION

1. Field of the Invention (Technical Field)

The present invention relates to rims for spoked wheels, and particularly to a sealing apparatus for use on such a rim.

2. Background Art

Vehicle wheels are sometimes spoked, that is there are spokes extending from the wheel rim to its hub. Wheeled spokes are less common on most vehicles than formerly, but are still popular on bicycles and motorcycles.

The rim involved is usually what is called a punched rim, i.e. featuring depressions for receiving and orienting the spoke nipples. This so-called punched hole thus ensures that the space formed between the rim and the tire disposed thereon is open and thus not air-tight. For this reason a tube is usually employed with such a spoke wheel. This known spoke wheel with a tube has a number of drawbacks.

Usually fitted between the rim bed and tube is a rim band designed to prevent damage of the tube at the spoke nipples, the combination of tire, tube, rim band and rim thus resulting in a high mass materializing for the spoke wheel formed as such. This in turn results in a high rotational moment of inertia of the spoke wheel formed as such, because of the radially outlying mass concentration, as viewed from the wheel hub, to the detriment of the handling agility of a motorcycle fitted with such a spoke wheel, for example, when intentionally changing directions. On top of this, the tube is also susceptible to damage in the form of snake bites, i.e. two holes materializing in the tube on bottoming, for instance after a jump with an off-road bike and subsequent landing in which the tube is squashed against the rim bed, resulting in two holes. Also needing to be provided on such a spoke wheel with a tube is a so-called tire holder on the rim which has the task of preventing the tire twisting out of place relative to the rim. This is because twisting of the tire is often accompanied with the problem of the twisting tire "entraining" the tube and thus the valve fitted to the tube, forcing it through the spoked rim, shearing it off.

To get around these problems tubeless tires are also already known, necessitating specially formed rims which, except for a hole for fitting the valve, comprise no opening in the rim bed. This results in the spokes also needing to be manufactured integrally with the rim bed on such tubeless rims, for instance as a cast rim which in turn are heavy and which because of the manufacture are also prone to fracture during casting and thus unsuitable for high loading.

Also to avoid these problems, attempts have already been made to create spoke wheels with tubeless tires. Examples of previous endeavors in the field are found in the following publications: Japanese patent disclosure No. JP 09002005; German patent disclosure No. DE AS 1002210; European Patent Office patent disclosure No. EP 0 615 865 A1; and USA patent disclosure U.S. Pat. No. 4,824,177.

Known also are spoke wheels with tubeless tires which attempt to do away with a sealing device in the region of the rim bed. Examples of prior publications in this field are: European Patent Office patent disclosure No. EP 0 962 338 A1, and Japanese patent disclosure No. JP 61054302.

When a tire is to be fitted to a wheel configured as such, there is no preventing the tire coming into contact with the rim band on fitting. This contact of the rim band with the tire causes the rim band to slip out of place on the rim, thus resulting in leakage locations between rim band and rim even before the wheel is inflated. The rim band needs to be reseated, but even this is no assurance of remedying the leakage locations, so that in practice the procedure is to stick the rim band to the rim. When removing the fitted tire, the leakage problem between rim band and rim is repeated, due to the tire again coming into contact with the rim band, displacing it, despite the stick. When then a new tire is mounted, the leakage problem can no longer be eliminated even when re-sticking the rim band to the rim.

Publications relating to the foregoing include the following: European Patent Office patent disclosure No. EP 06 16 911 A2; USA patent disclosure U.S. Pat. No. 3,335,778; German patent disclosure No. DE 203 16 995 U1; German patent disclosure No. DE 38 78 397 T2; and German patent disclosure No. DE 298 03 256 U1.

Against the foregoing background, the present invention was developed.

SUMMARY OF THE INVENTION (DISCLOSURE OF THE INVENTION)

The disclosure relates to a rim of a spoke wheel for tubeless tires including a sealing device arranged in the region of a rim bed in a well of the rim, and the rim having on both sides of an imaginary rim center plane a relief with sealing areas. The disclosure further relates to a rim of a spoke wheel for tubeless tires, and to a sealing device for a rim of a spoke wheel with a tubeless tire. The disclosed rim of a spoke wheel for tubeless tires includes a sealing device, and the rim as well as the sealing device are provided especially for use on motorcycles and bicycles, but also on other vehicles making use of spoke wheels. On such a spoke wheel a plurality of spokes extend between the rim and a wheel hub.

The present disclosure has the object of providing a rim of a spoke wheel for tubeless tires with a sealing device, to make it possible to eliminate use of a tube and to use conventional tubeless tires not needing to be specially adapted to the shape of the rim. In addition, it is intended that the rim with the sealing device makes for a lightweight spoke wheel with a tubeless tire, combining fully compatible off-road performance with high handling agility while preventing deflation of the wheel configured as such, even at low inflation pressures and high angular velocity of rotation of the spoke wheel. Furthermore, the rim is intended to facilitate fitting the sealing device and tire fitting and removal while ensuring that the sealing device is not shifted out of place on the rim during tire fitting and removal. In addition, it is intended to provide a rim and a sealing device suitable for forming such a spoke wheel with tubeless tires.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 2b is a partial view showing a segment of a sealing device in the fitted condition but shown separate from the rim as shown in FIG. 2a;

Figure 1:
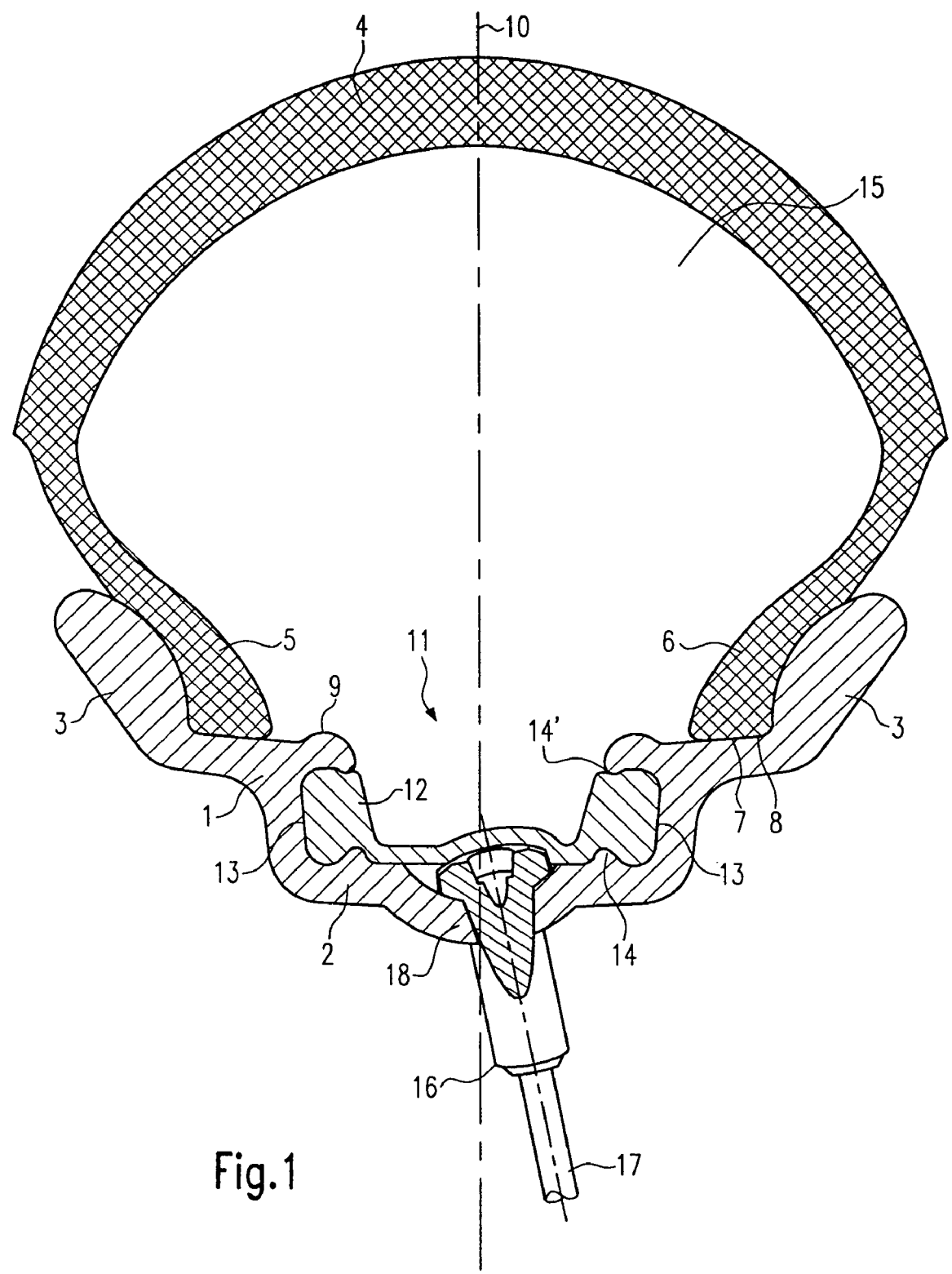
FIG. 1 is a partial section view of one embodiment of a rim including a sealing device in accordance with the invention with a tubeless tire fitted thereto.

DESCRIPTION OF THE PREFERRED EMBODIMENTS (BEST MODES FOR CARRYING OUT THE INVENTION)

The present disclosure relates to a rim of a spoke wheel for tubeless tires including a sealing device arranged in the region of a rim bed in a well of the rim. The rim has on both sides of an rim imaginary center plane a relief with sealing areas, the relief being provided with two constrictions forming sealing areas and the sealing device being configured substantially complementary in shape and size to the relief and is arranged therein.

For convenience, the reference numerals used in the drawings are here listed with the corresponding apparatus components identified thereby:

LIST OF REFERENCE NUMERALS

1 rim
2 rim bed
3 rim flange
4 tire
5 bead
6 bead
7 end portion
8 bead seat
9 hump
10 rim center plane
11 well
12 sealing device
13 relief
14 constriction, sealing area
14' constriction, sealing area
15 interior space
16 spoke nipple
17 spoke
18 punched hole
19 upper end portion
20 lower end portion
21 upper end area
22 lower end area
23 facing portion
24 portion for accommodation
25 sealing device
26 constriction
27 sealing device
28 depression
29 sealing lip
30 connecting portion
31 hollow chamber
32 depression
33 connecting portion
34 connecting portion
35 valve
36 sealing device
37 wing
38 constriction
39 middle portion
40 layer
41 layer
42 gap
43 curved shape
44 sealing device
45 web
46 sealing device
47 lug
48 sealing device
49 inlay
50 connecting portion
F double arrow
P arrow Referring now to FIG. 1, there is illustrated in a section view a rim with sealing device and fitted tire in an embodiment in accordance with the present disclosure. The rim 1 comprises a rim bed 2 and a rim flange 3. A tire 4 contacts by its bead 5, 6, on the one hand, the rim flange 3 and by its portion 7 assigned to each end portion of the bead 5, 6 a bead seat 8, on the other.

The bead seat 8 in this arrangement extends from the rim flange inwards up to a hump 9 in each case which prevents the bead 5, 6 from popping out of place in the region of the rim bed 2.

Reference numeral 10 denotes a center plane of the rim dividing the rim 1 into two substantially mirror-symmetrical halves.

Provided in the region of the rim bed 2 downswept from the plane of the bead seat is a well 11 serving to accommodate a sealing device 12. As directly evident from the drawing, the rim 1 comprises in the region of the well 11 on both sides of the rim center plane 10 a relief 13 which in the embodiment of the rim 1 as shown in FIG. 1 of the drawing extends from the region of the hump 9 to the region of the rim bed 2.

In this arrangement the sealing device 12 is configured substantially complementary in shape and size to the relief 13 and is mounted in the relief 13. The sealing device 12 which may be made, for example, of an elastomer such as for example soft rubber, closed-pore cellulose, or the like is in full nesting contact with the portion of the relief 13 provided on both sides of the center plane of the rim and is for this purpose configured to comply with the shape and individual surface areas of the areas of the rim 1 forming the relief 13.

Although the sealing device 12 nests in the portion of the relief 13 on both sides it may be dimensioned in a condition separate from being mounted in the relief 13 so that pressure forces materialize between the sealing device 12 and the surface areas forming the relief 13 when the sealing device is arranged in the relief 13 which produce surface contact of the sealing device 12 with the relief 13 fully or near-fully. The relief 13 comprises at both its end portion facing the rim bed 2 and at its end portion facing the hump 9 a constriction 14, 14' in each case resulting in a localized higher contact pressure between the sealing device 12 and constriction 14, 14' of the relief 13 in the region of the constriction 14, 14' so that the interior space 15 between rim 1, sealing device 12 and tubeless tire 4 is hermetically sealed.

As directly evident from FIG. 1 of the drawings, the sealing device 12 covers the complete portion of the rim bed from the relief 13 on the right in the plane of the drawing over the rim bed 2 up to the portion of the relief 13 on the left in the plane of the drawing and particularly thereby a spoke nipple 16 of a spoke 17. The spoke nipple 16 passes through a hole 18 punched in the rim bed 2 of the rim 1. Any deflation through this hole 18 from the interior space 15 is, however, rendered impossible by the sealing device 12 totally covering the rim bed 2.

Figure 2A:
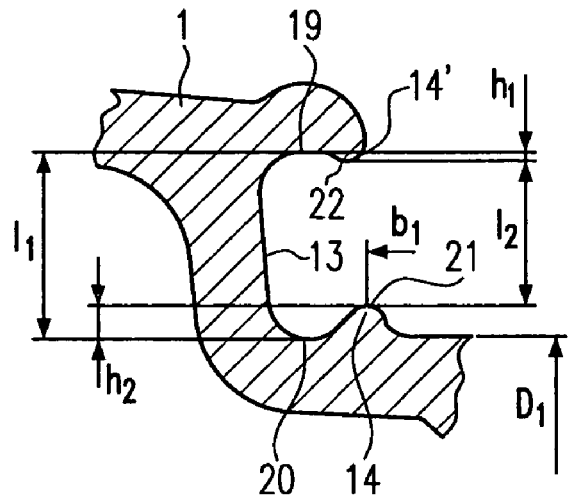
FIG. 2a is a detail of a rim in the region of the relief to assist in explaining a few geometrical relationships.

Referring now to FIG. 2a, there is illustrated a detail of the rim 1 taken from the portion of the relief 13 on the left of the rim as shown in FIG. 1 while FIG. 2 shows a detail of the sealing device 12 accommodated in the region of this relief corresponding to the fitted condition of the sealing device 12 but in an illustration separate from the rim 1. The dimension $I_1$ designates the clear height of the relief 13 from the upper end portion 19 down to the lower end portion 20. $I_2$ designates the clear height between the upper end area 21 of the constriction 14 and the lower end area 22 of the constriction 14', whereby $I_1 > I_2$ for the rim 1.

The label $h_1$ designates the height of the constriction 14' between the upper end portion 19 and lower end area 22 while $h_2$ designates the height of the constriction 14 between the lower end portion 20 and the upper end area 21. Both $h_1$ and $h_2$ are greater than 0 in the embodiment as shown. $D_1$ designates the diameter of the radially opposed lower end portion 20 of the rim, and $b_1$ designates the clear cross-sectional width of the two opposed constrictions 14 of the rim 1.

Figure 2B:
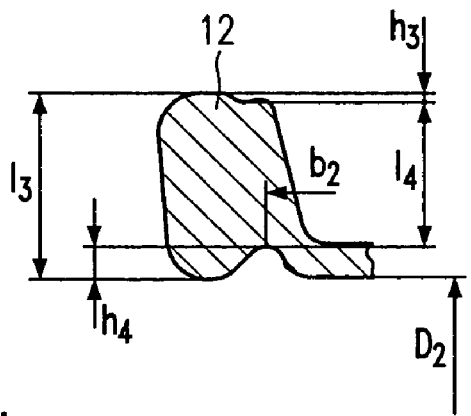

Referring now to FIG. 2b, there is illustrated $I_3$ designating the clear height of the sealing device 12 in the fitted condition which, when the sealing device 12 is accommodated in the relief 13, corresponds to the clear height $I_1$. The situation is similar for the clear height $I_4$ which in the fitted condition corresponds to the clear height $I_2$ and the clear height $h_3$ which in the fitted condition corresponds to the clear height $h_1$, as well as the clear height $h_4$ which in the fitted condition corresponds to clear height $h_2$. When the sealing device 12 is located on the rim 1 the diameter $D_2$ corresponds to the diameter $D_1$, and likewise in the fitted condition of the sealing device 12 the clear width $b_2$ corresponds to the clear width $b_1$.

Figure 3:
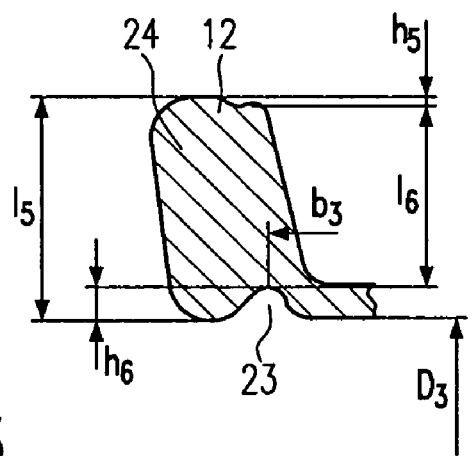
FIG. 3 is a detail similar to that of FIG. 2b showing the sealing device, but in the non-fitted condition.

Referring to FIG. 3 of the drawings, there is illustrated cross-sectionally a detail of the sealing device 12 in the non-fitted condition in which the clear height $I_5$ is greater than the clear height $I_1$ of the relief 13 of the rim 1 and likewise is the clear height $I_6$ of the sealing device 12 greater than the clear height $I_2$ of the relief 13. In these two conditions it is achieved that the sealing device 12 is inserted biased into the relief 13 to prevent the sealing device from slipping out of place from the relief 13, no matter how hard the ride. Because in the non-fitted condition of the sealing device 12 the clear height $h_5$ is smaller than the clear height $h_1$ of the rim 1, it is likewise ensured that the sealing device 12 when located in the relief receives a contact force, the situation being similar due to the clear height $h_6$ of the sealing device 12 being smaller than the clear height $h_2$ of the rim 1.

In the non-fitted condition of the sealing device 12 the cross-sectional width $b_3$ of the portion 23 facing the constriction 14 of the relief 13 of the sealing device 12 is greater than the corresponding cross-sectional width $b_1$ of the rim 1. Since namely the diameter $D_3$ of the sealing device 12 in the non-fitted condition is smaller than the corresponding diameter $D_1$ of the rim 1, the sealing device 12 when located on the rim 1 is radially expanded so that from satisfying the condition that cross-sectional width $b_3$ is greater than cross-sectional width $b_1$ it is assured that due to the change in shape of the sealing device 12 resulting from the relative expansion of the sealing device 12 the portion 24 for accommodating the sealing device 12 to be accommodated in the relief 13 does not slip out of place from the relief 13.

Figure 4:
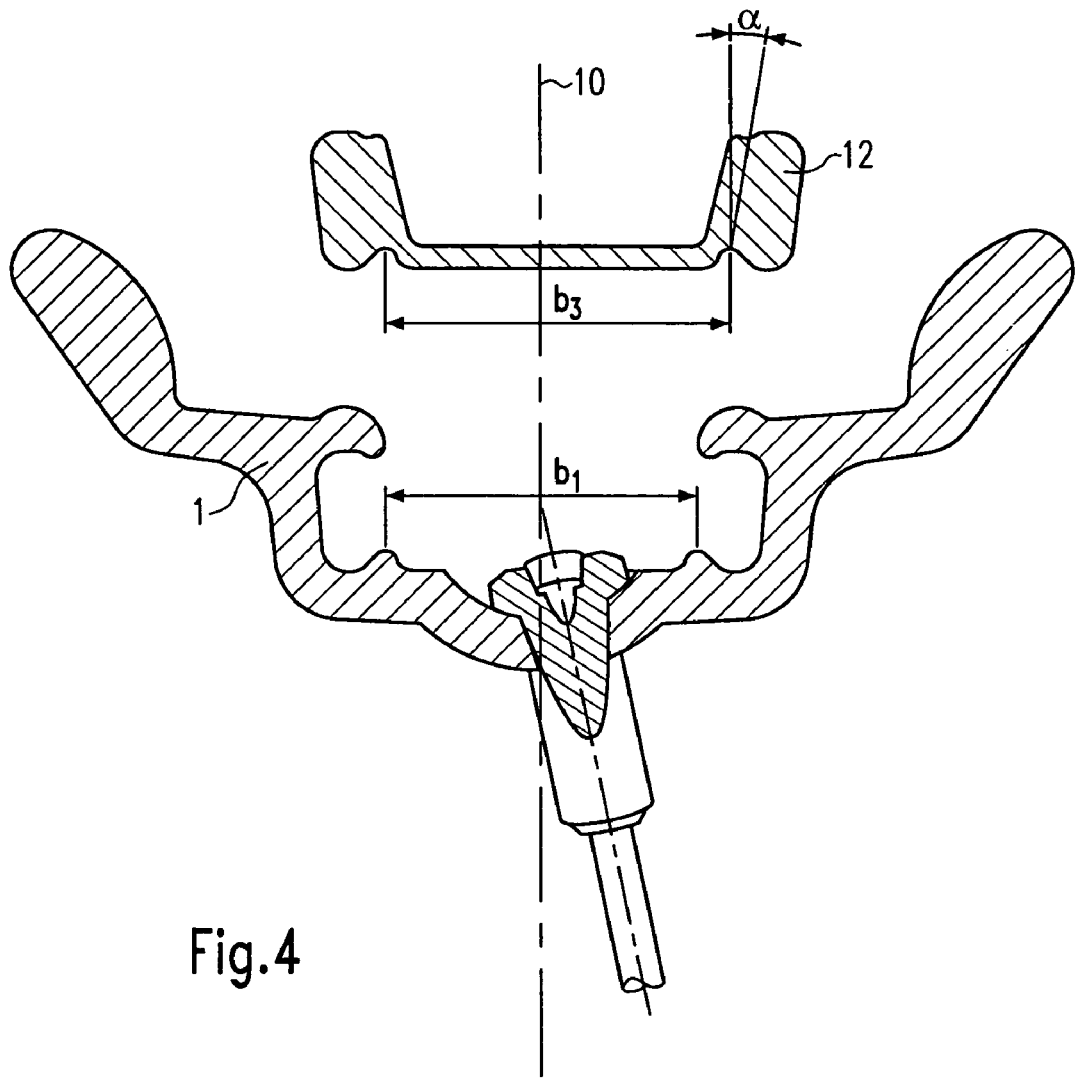
FIG. 4 is a separate illustration showing the non-fitted condition of a sealing device and a rim, each in embodiments in accordance with the present invention.

Referring to FIG. 4 of the drawings, there is illustrated the rim 1 and sealing device 12 separated. Fitting the sealing device 12 to the rim 1 results in an increase in the diameter of the sealing device 12, i.e. it being inserted biased in the well 11 and thus in the relief 13 provided on both sides of the rim center plane 10. Since the cross-sectional width $b_3$ of the sealing device 12 in the non-fitted condition is greater than the cross-sectional width $b_1$ of the rim 1 the sealing device 12 is substantially in total contact in the region of the relief 13 despite the reduction in the overall width of the sealing device 12 occurring during the increase in the diameter.

Figure 8:
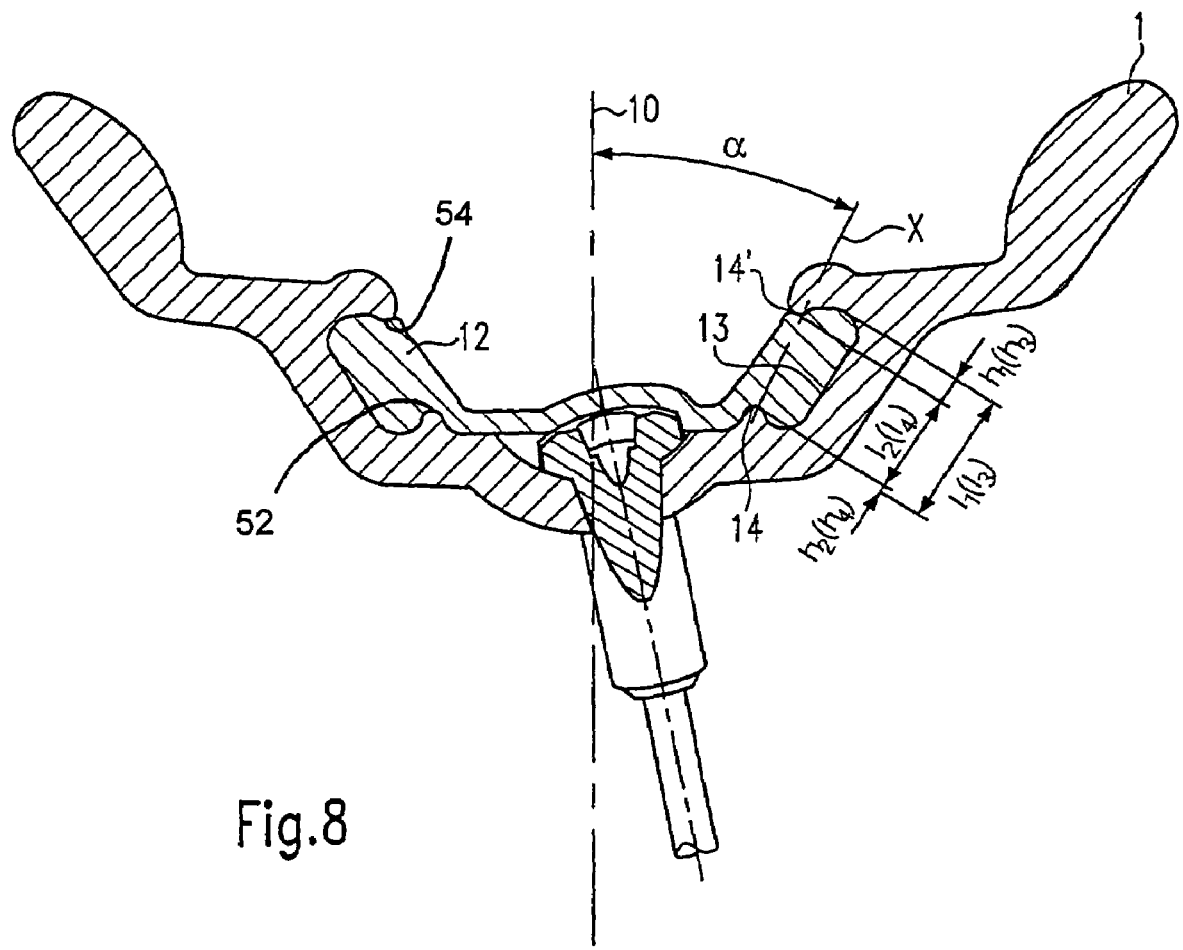
FIG. 8 is a section view of one embodiment of a rim including the sealing device arranged on both sides of the center plane of the rim.

FIG. 4 shows an angle α materializing as the angle between the rim center plane 10 of a parallel thereto and a plane spanning the sealing areas including the constrictions 14, 14' or as configured thereon in the cross-sectional view. The angle α can assume values in the range of approximately −20 degree to approximately 120 degree, i.e. the plane spanning the sealing areas can extend in a range from a negative angle of 20 degree to the rim center plane 10 up to an angle of approximately 120 degree thereto. Because this angle α can also assume values smaller than 0 degree, i.e. for example values from approximately −20 degree to approximately 120 degrees, the covering plane X, shown on the right of the rim center plane in the plane of the drawing as shown in FIG. 8, can also be oriented inclined to the left. This configuration would materialize when placing a parallel to the rim center plane 10 through the lower sealing area 14 and mirroring at this parallel the upper sealing area 14' so that it lies to the left of the parallel. The plane thus then would span the sealing areas 14, 14' including a negative angle of, for example, −20 degree with the rim center plane.

Figure 5:
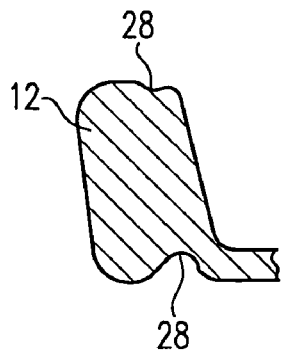
FIGS. 5, 6, and 7 are each partial section views of embodiments of the sealing device.
Figure 6:
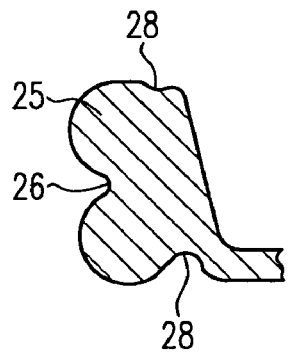
Figure 7:
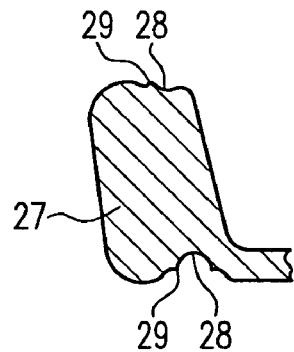

In FIGS. 5, 6 and 7 there are illustrated partial section views of various embodiments of the sealing device 12, whereby the embodiment as shown in FIG. 5 of the drawing corresponds to the embodiment as shown in FIGS. 1 to 4 of the drawing while the embodiment of a sealing device 25 as shown in FIG. 6 of the drawing differs by it featuring a constriction 26 oriented substantially transversely to the center plane of the rim. When the sealing device 25 is inserted into the relief 13, this constriction 26 results in the sealing device 25 being easier to compress elastically than the sealing device 12 as shown in FIG. 5. Once the sealing device 25, when being fitted into the relief 13, has negotiated the portion of the constriction 14 of the rim 1, the sealing device 25 then experiences an elastic extension and the constriction 26 assumes its original shape.

Referring to FIG. 7 of the drawings, there is illustrated an embodiment of a sealing device 27 similar to that as shown in FIG. 5, except that the sealing device 27 has at the depression 28 facing the constriction 14 of the relief 13 a sealing lip 29 in each case which extends from the depression 28 radially outwards to the relief or constrictions 14, 14' in thus locally increasing the contact pressure occurring in-between.

Reference is invited to FIG. 8. In addition to locally increasing the contact pressure in this embodiment the rim in accordance with the present disclosure featuring the sealing device 12 is characterized by the—relative to the rim 1—radially outlying sealing area 54 receiving an increasing contact force in the region of the constriction 14' with increasing angular velocity of rotation of the rim, resulting in an increase in the contact pressure in this portion of the sealing area 54. Thus even when the pressure within the interior space 15 is low, for example to increase the traction of the tire 4 on a loose surface, this configuration safely prevents deflation from the interior space 15 even at high speeds and thus high angular velocity of rotation of the rim 1 since the contact pressure between the sealing device 12 and the sealing area 54 in the region of the constriction 14' of the relief 13 increases.

In FIG. 8 of the drawings, there is illustrated in a cross-sectional view a modified embodiment of a rim 1 with sealing device 12. As directly evident from FIG. 8 in comparison to FIG. 4, the angle α in the embodiment as shown in FIG. 8 is larger than the angle α in the embodiment as shown in FIG. 4. The sealing areas in the region of the constrictions 14, 14' facing each other in the region of the relief 13 and inclined at an angle α to the rim center plane 10 seal the interior space 15 surrounded by the tubeless tire (not shown). Increasing the angle α permits achieving, for example, that the mouth of the rim is increased in width to thus permit fitting tires having a larger cross-sectional width. FIG. 8 also shows the plane identified "X" covering the sealing areas 14, 14' and oriented at an angle α to the rim center plane 10. Irrespective of the angle α the height of the sealing device as projected onto the rim center plane 10—in other words the height of the sealing device in the radial direction of the rim—is greater than the corresponding height of the relief, i.e. the height of the relief as projected onto the rim center plane 10. This is why the sealing device is always located biased in the relief.

Figure 9:
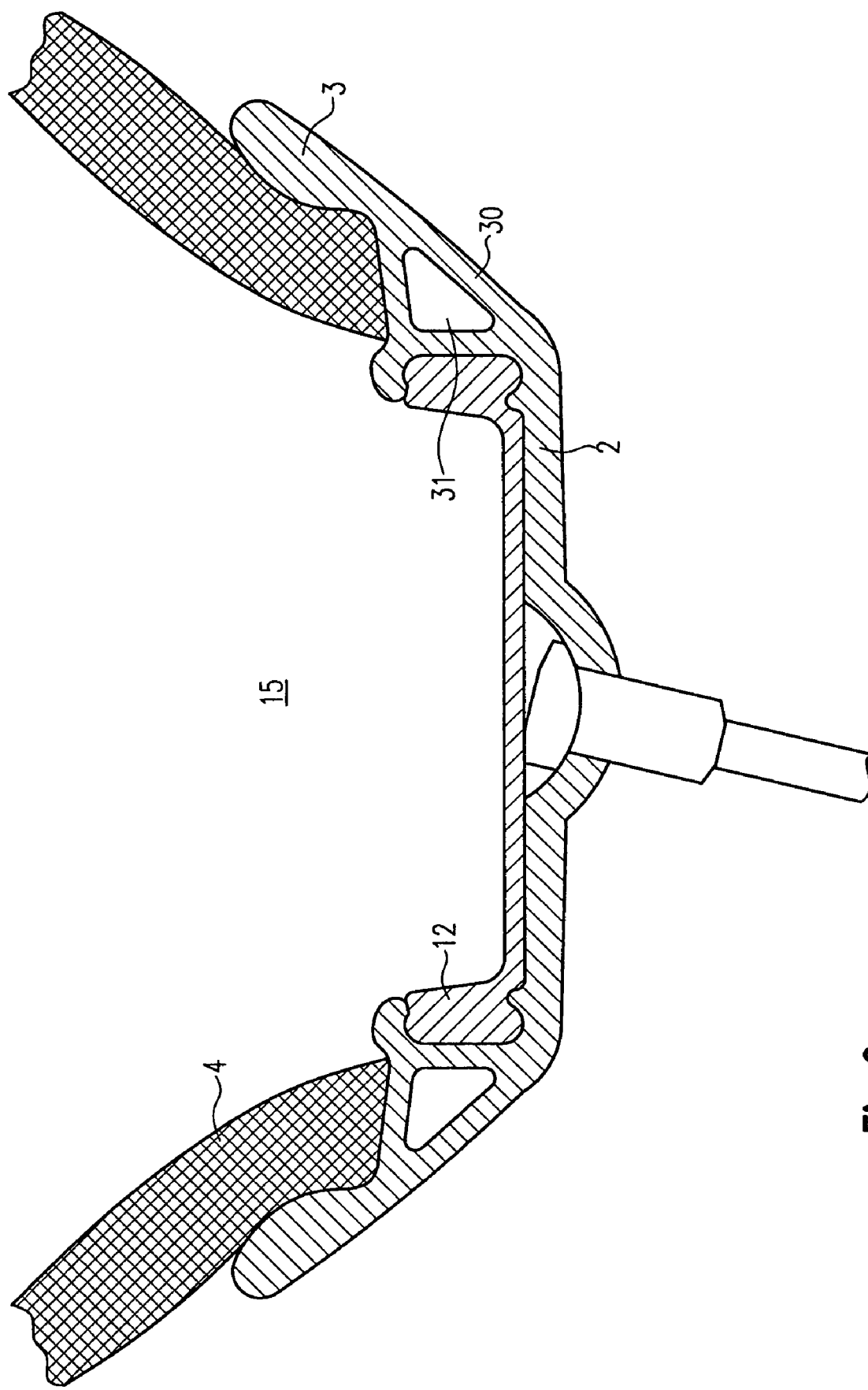
FIG. 9 is a section view of an embodiment of a rim featuring a linear portion connecting an outer portion of the rim bed and the rim flange with a hollow chamber profile.

Referring now to FIG. 9 of the drawings, there is illustrated a modified embodiment of the rim in accordance with the present disclosure. Again as directly evident, this rim comprises in the region connecting the rim flange 3 and the rim bed 2 a linear connecting portion 30 which due to the lack of uneven areas in the outer region of the rim makes for facilitated cleaning of the rim, as may be of advantage on off-road bikes negotiating loose surfaces. To avoid opposing this advantage with the drawback of a high rotational moment of inertia of the rim 1 as shown in FIG. 1, the rim as evident from FIG. 9 is structured in the linear connecting portion 30 with a hollow chamber profile incorporating a hollow chamber 31. In this embodiment of the rim 1 there are not only the advantages as aforementioned in sealing the interior space 15 by the sealing device 12 covering the deep bed or rim bed 2, but also the advantages of high stiffness, simple surface machining and the good cleaning possibility as aforementioned.

Figure 10:
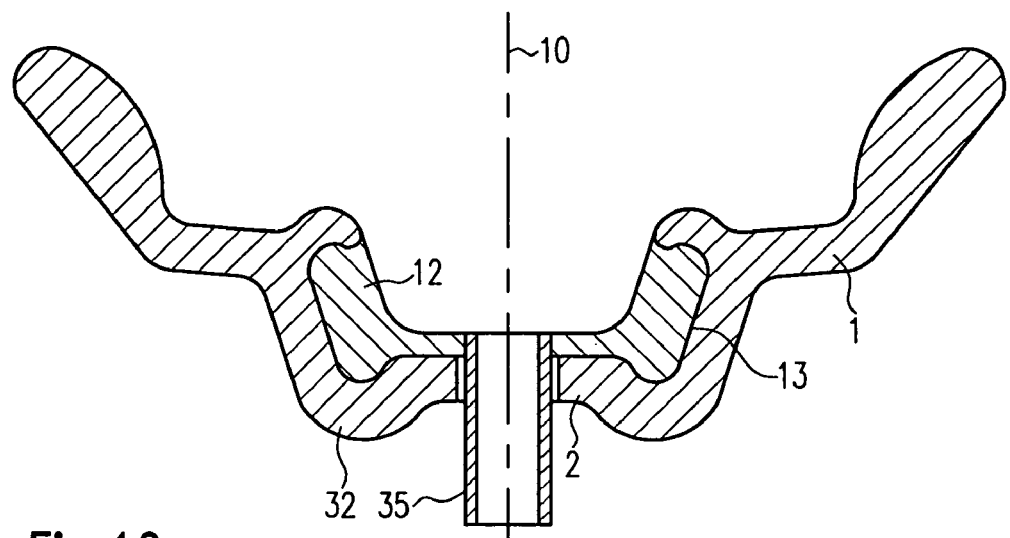
FIG. 10 is a section view of a rim including the sealing device in one embodiment in accordance with the present invention.

Referring now to FIG. 10, there is illustrated a further modified embodiment of a rim 1. This rim 1 differs from the rim as shown in FIG. 1 substantially by the rim bed 2 featuring on both sides of the rim center plane 10 in the direction of the wheel hub (not shown) a radially in-swept depression 32. Also the portion of the relief 13 in this embodiment of the rim is structured slightly modified as compared to the embodiment as shown in FIG. 1 of the drawing, in which the conditions $I_1 > I_2$, $h_1 > 0$ and $h_2 > 0$ as explained with reference to FIG. 2 continue to be satisfied, however. In addition FIG. 10 also shows diagrammatically a valve 35 vulcanized in place in the sealing device 12. Such a valve 35 may also be provided in the sealing devices as shown in each of the other FIGs. for inflating the interior space 15.

Figure 11:
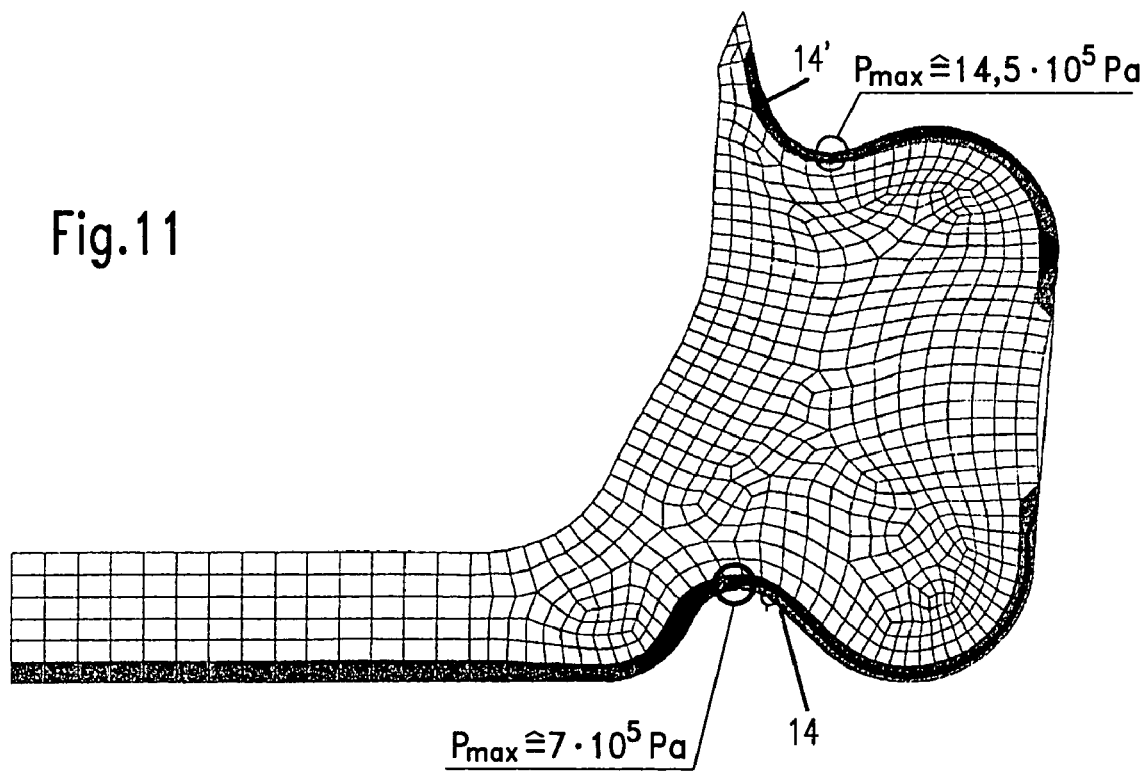
FIG. 11 is a diagram assisting explaining the contact pressure between the sealing device and the sealing areas of the relief.

Referring now to FIG. 11 of the drawings, there is illustrated graphically the pressure conditions existing at the sealing device 12 as plotted for a tire pressure of 1 bar existing in the interior space 15 and a computed maximum speed of approximately 250 km/h of a motorcycle fitted with the rim in accordance with the present disclosure including sealing device and tubeless tire. As evident from the diagram serving as an example, a contact pressure of 0.7 N/mm$^2$ materializes in the region of the sealing area facing the constriction 14 under the cited riding conditions, corresponding to a pressure ratio of 7 bar ($7 \times 10^5$ Pa) and a pressure of 1.45 N/mm$^2$ at the radially outlying portion of the sealing area facing the constriction 14', corresponding to a pressure ratio of 14.5 bar ($14.5 \times 10^5$ Pa). This makes it clear that the rim in accordance with the present disclosure including the sealing device permits mounting a tubeless tire on a spoked rim while assuring safe riding conditions in preventing deflation of the interior space 15.

In a modified version of the sealing device 12, it is also possible to configure it so that the pressure conditions at the inward sealing area portion 52 and outlying sealing area portion 54 of the rim 1 (FIG. 8) are substantially the same with the vehicle stationary, resulting in the pressure existing in the region of the sealing areas 52, 54 being greater than 1 bar ($1 \times 10^5$ Pa). Since, because of the centrifugal forces in the region of the outlying sealing area 54 when the spoke wheel is rotating, higher pressures materialize than in the region of the inward sealing area 52, distribution of the masses of the sealing device 12 can be modified so that roughly the same pressure conditions exist in the region of the outlying sealing area 54 as in the region of the inward sealing area 52 also in rotation of the spoke wheel.

Figure 12:
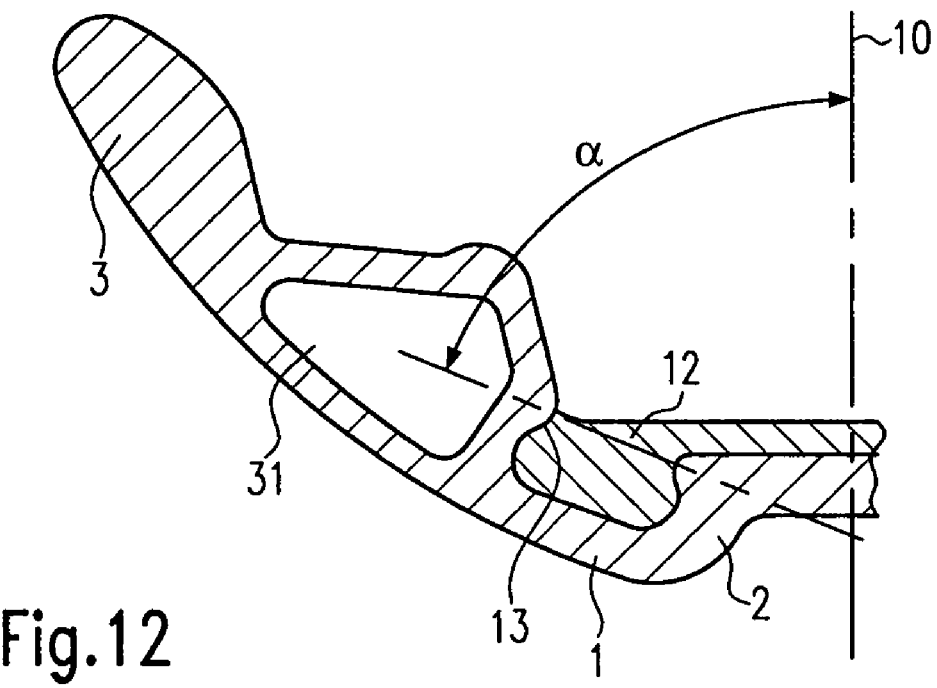
FIG. 12 is partial section view of a modified embodiment of a rim including the sealing device and a continuous connecting portion in accordance with the present invention.

Referring now to FIG. 12 there is illustrated yet a further modified embodiment of a rim 1 in accordance with the present disclosure. As directly evident, this rim 1 comprises sealing areas slanting at an angle α to the center plane 10 of the rim at the relief 13 and also has a hollow chamber 31 in the region connecting the rim bed 2 and rim flange 3, the hollow chamber 31 in turn serving to reduce the rotationally moved masses. It is also evident from FIG. 12 that the portion connecting the rim bed 2 and rim flange 3 is configured with a continuous curvature, i.e. the connecting portion has a continuous profile with no discontinuities.

Figure 13:
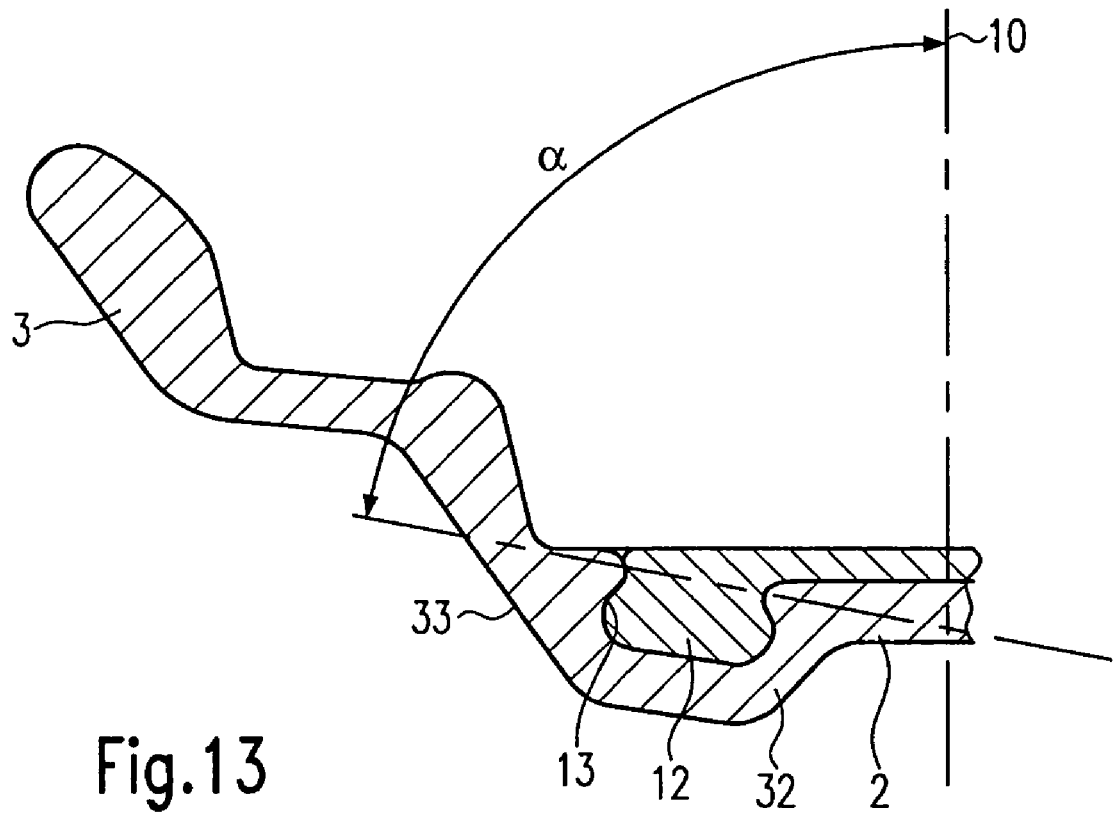
FIG. 13 is a view similar to that as shown in FIG. 12 showing a rim including the sealing device in a modified embodiment.

In FIG. 13 there is illustrated still another modified embodiment of a rim 1, featuring an even larger angle α between the sealing areas located in the region of the relief 13 of the rim 1 and the rim center plane 10. Similar to the embodiment as shown in FIG. 10 of the drawing, this embodiment comprises a depression 32 with a stepped connecting portion 33 connecting the rim bed 2 and rim flange 3.

Figure 14:
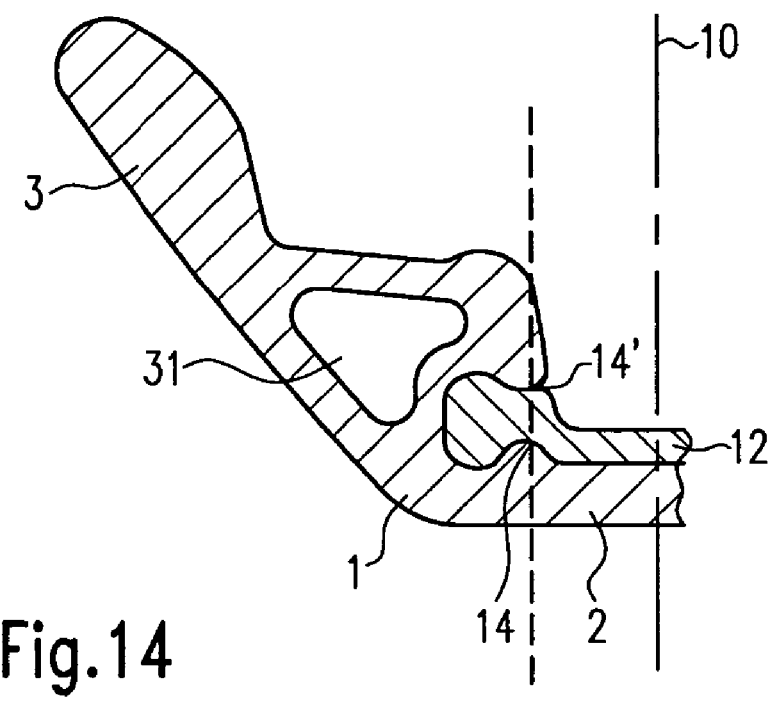
FIG. 14 is a partial section view of a rim with a hollow chamber profile in the portion connecting rim flange and rim bed and sealing device.

FIG. 14 shows a further modified embodiment of a rim 1 featuring a sealing device 12 in accordance with the present disclosure. As directly evident the rim 1 as shown in FIG. 14 has a linear region connecting the rim bed 2 and rim flange 3 with a hollow chamber 31 included in this portion. The sealing areas located in the region of the constrictions 14 and 14' cover a plane oriented substantially parallel to the rim center plane 10 so that in this embodiment the angle α as defined above assumes a value of approximately 0 degree.

Figure 15:
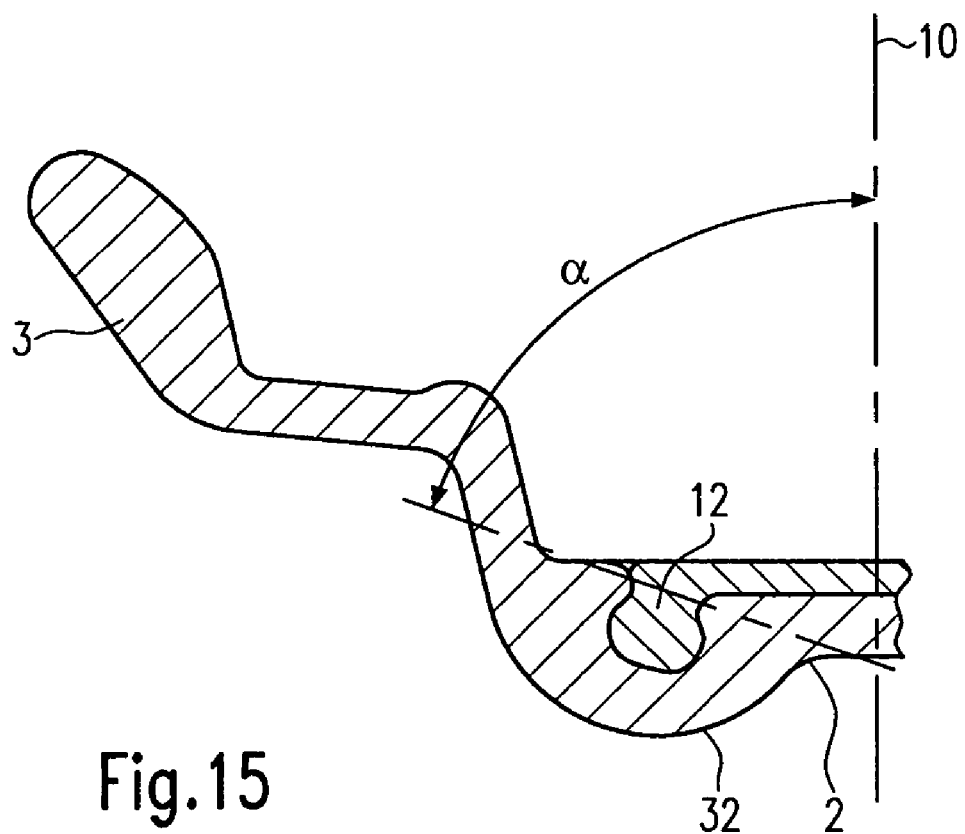
FIG. 15 is a view similar to that as shown in FIG. 13 of an embodiment of a rim including a sealing device in accordance with the present invention.

Referring now to FIG. 15 of the drawings, there is illustrated a modified embodiment of a rim 1 with a sealing device 12 in accordance with the present disclosure. In this embodiment the angle α assumes a value of approximately 70 degree and the rim 1 features a depression 32 similar to that of the embodiment as shown in FIG. 10 of the drawing.

Figure 16:
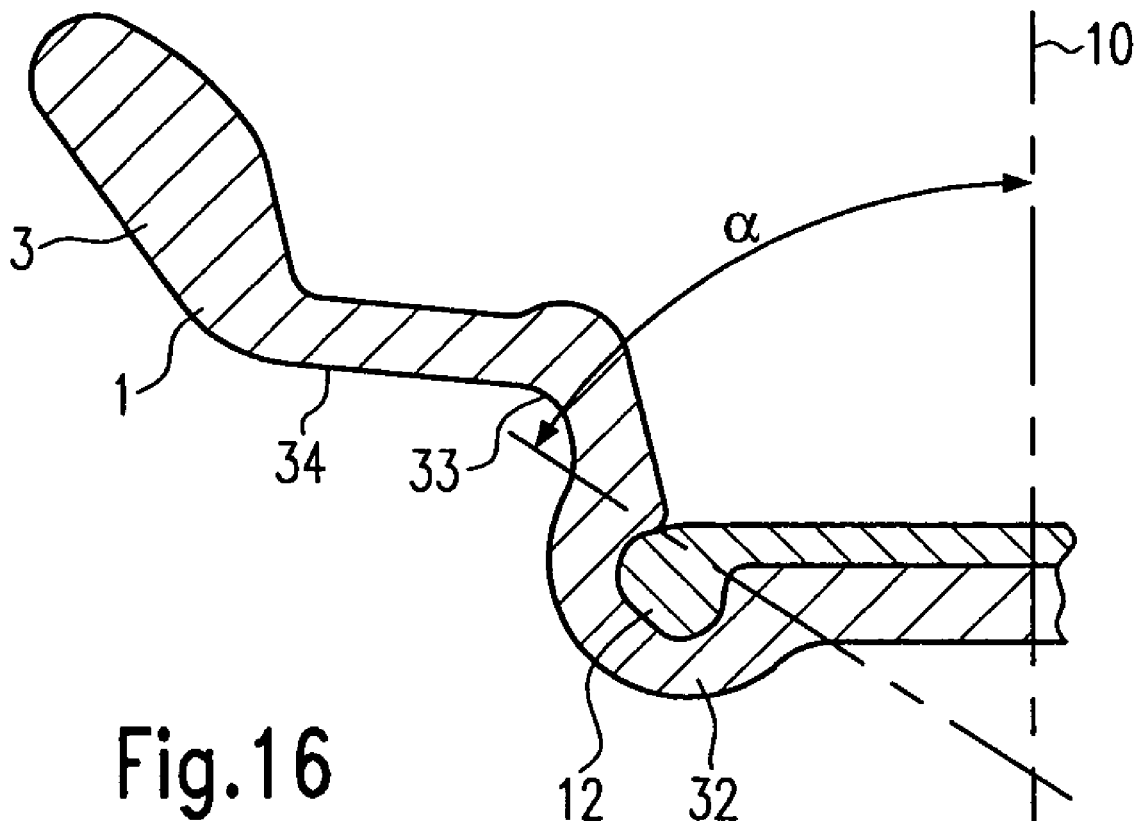
FIGS. 16 and 17 are partial section views of embodiments of a rim with sealing device.
Figure 17:
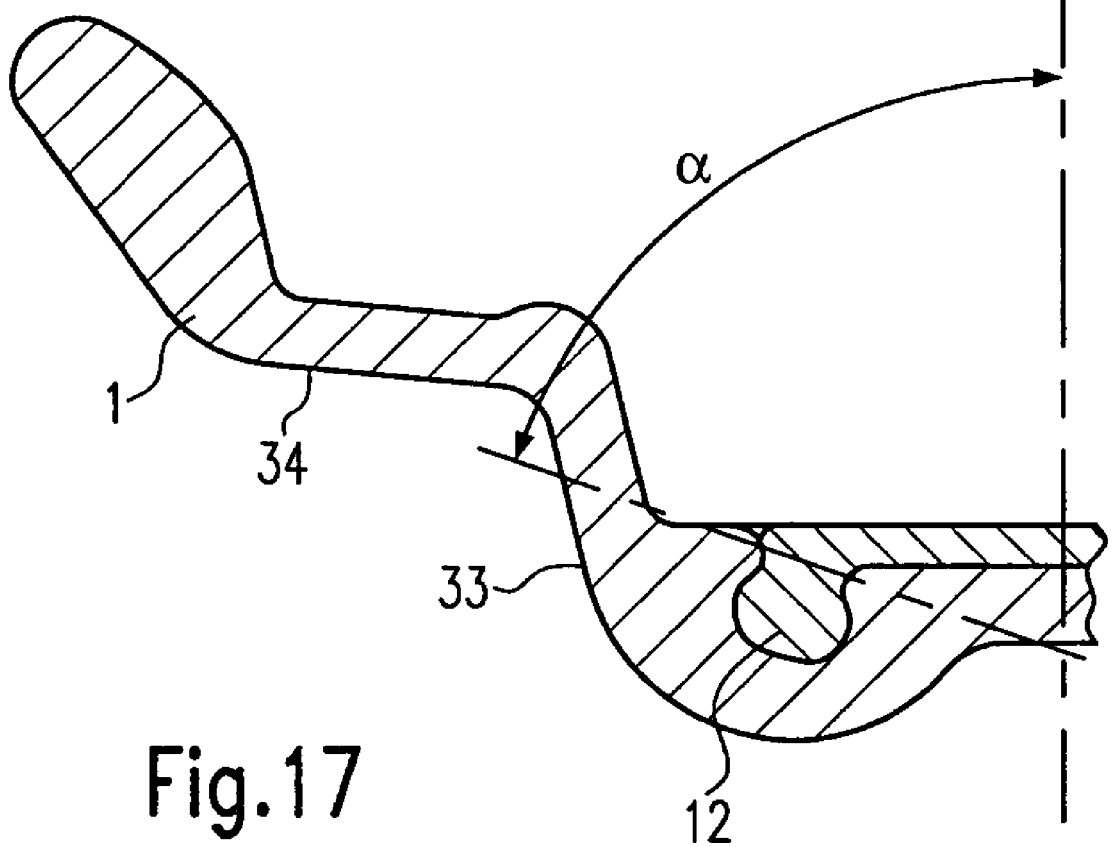

In FIGS. 16 and 17 of the drawings, there are illustrated modified embodiments of a rim 1 with a sealing device 12 in accordance with the present disclosure. In the embodiment of the rim 1 as shown in FIG. 16 the connecting portion 33 connecting the depression 32 and rim flange 3 is firstly inswept and then runs linearly in the region of the connecting portion 34 while the connecting portion 33 in the rim 1 as shown in FIG. 17 increases at an angle of approximately 15 degree to the rim center plane 10 and then transforms into a connecting portion 34 oriented substantially transversely to the rim center plane 10.

Figure 18:
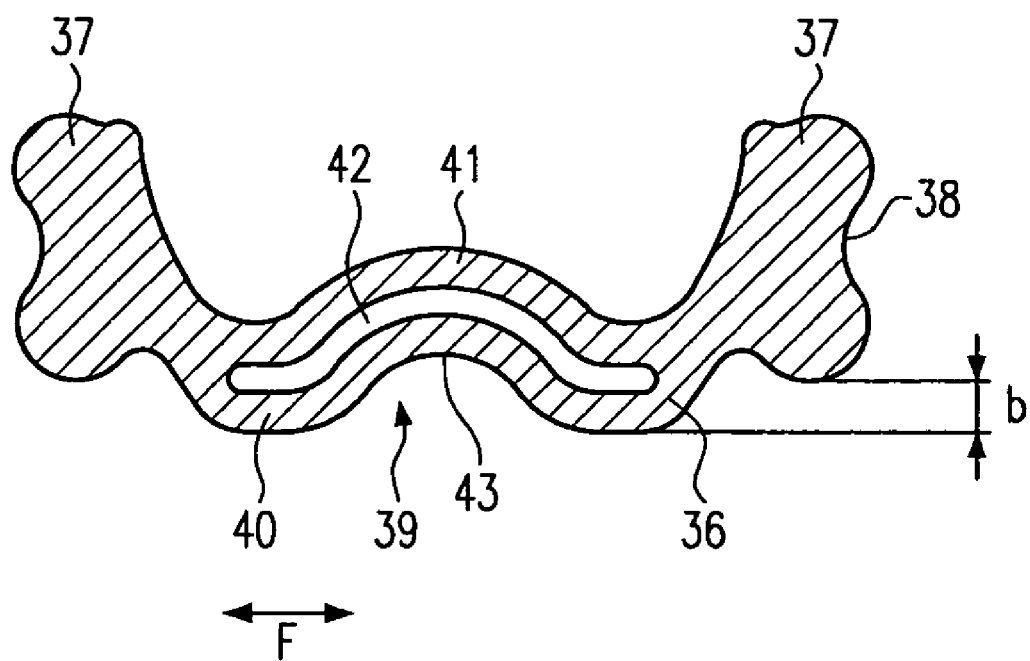
FIG. 18 is a section view of a further embodiment of a sealing device.

Referring now to FIG. 18 of the drawing there is illustrated a section view of a further embodiment of a sealing device 36. As directly evident this sealing device 36 similar to sealing devices 12, 25 and 27 as already described comprises side wings 37 provided for fitting in the reliefs 13 of the rim. Provided also in the sealing device 36 at the wing 37 is a constriction 38 serving to facilitate compression of the sealing device 36 elastically in the direction of the arrow P (FIG. 23) so that it can be inserted into the relief 13 of the rim 1 without requiring severe force.

In the embodiment of the sealing device 36 as shown in FIG. 18 a middle portion 39 between the two wings 37 is configured differently to the sealing devices as described above. As is directly evident, the middle portion 39 is divided into two layers 40, 41 with a gap 42 in-between. The two layers 40, 41 ensure that any damage materializing at the lower layer 40, for example due to a spoke nipple or a sharp-edged end of a spoke, cannot propagate in the form of a crack up to the upper layer 41. For, namely even if such a crack should occur at the lower layer 40 it cannot overcome the gap 42 between the two layers 40, 41 so that the upper layer 41 remains undamaged and there is no deflation of the interior space 15.

As also evident from FIG. 18, the sealing device 36 features in the middle portion 39 a curved shape 43 in a departure from a linear contour so that the sealing device 36 can be simply squeezed together in the direction of the double arrow F for facilitated fitted to the rim where it locates in the rim 1 as predetermined. Instead of the curved shape 43 any other shape is feasible as long as it permits pliant squeezing of the sealing device 36 in the direction of the double arrow F such as, for example, in the form of part of an ellipse or in the form of a gable roof or the like. This aspect results also in an effect similar to that as described in conjunction with FIG. 4, i.e. that the wings 37 accommodated in the reliefs 13 cannot slip out of place from the reliefs, because the curved shape acts like a spring in the width direction of the rim and thus the wings are thus urged into the reliefs biased.

Figure 19:
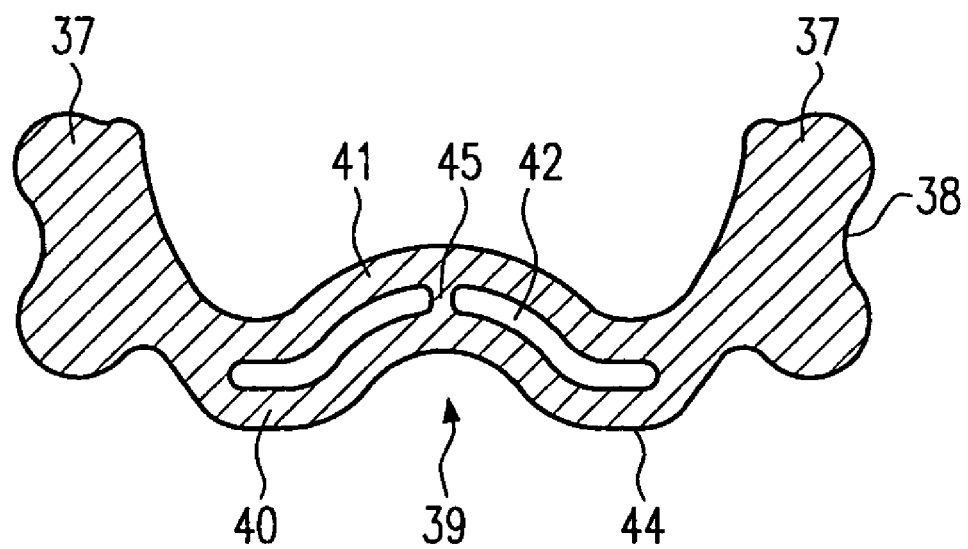
FIG. 19 is a section view of a further embodiment of a sealing device.

Referring now to FIG. 19, a section view of a further embodiment of a sealing device 44 is depicted. This substantially differs from the sealing device 36 as shown in FIG. 18 in that in the middle portion 39 between the lower layer 40 and upper layer 41 a web 45 is provided integral with the two layers 40, 41 which in maintaining the gap 42 connects the lower layer 40 to the upper layer 41. In maintaining the advantages of the two-layer configuration of the sealing device 44 in the middle portion 39 this configuration ensures that the two layers 40, 41 remain spaced away from each other during fabrication of the sealing device 44 and, for example, cannot stick together, it also having been shown that this prevents any damage to the sealing device 44 possible occurring at the lower layer 40 because of a spoke nipple or end of a spoke from propagating via the web 45 up into the upper layer 41.

Figure 20:
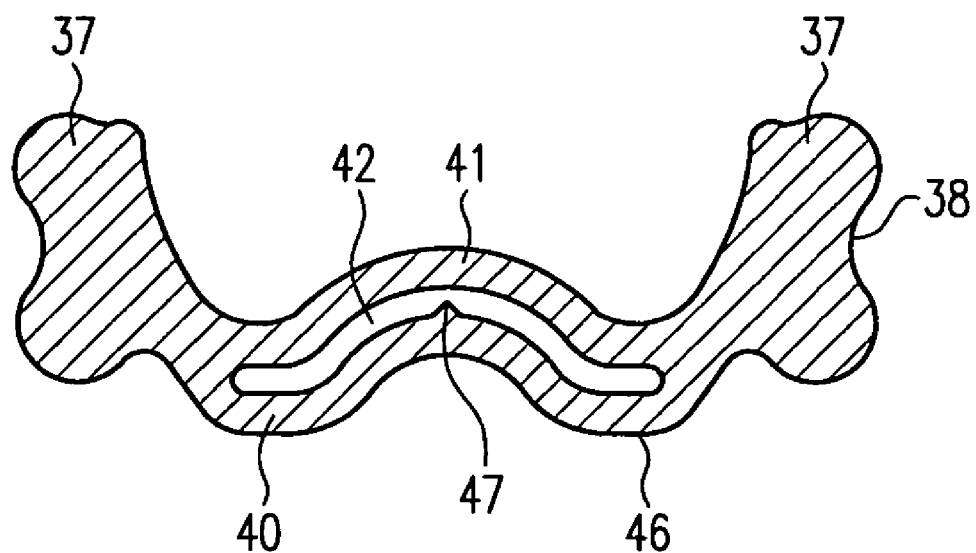
FIG. 20 is a section view of a further embodiment of a sealing device.

Referring now to FIG. 20, there is illustrated a sealing device 46 having the same advantages as above, but differing from the sealing device 44 as shown in FIG. 19 substantially by in place of the web 45 a lug 47 having only one layer, namely the layer 40 configured integral therewith is provided which in maintaining the gap 42 ensures that the two layers 40, 41 cannot stick together, it having been shown in addition that any damage to the lower layer 40 cannot propagate as a crack via the lug 47 to the upper layer 41.

Figure 21:
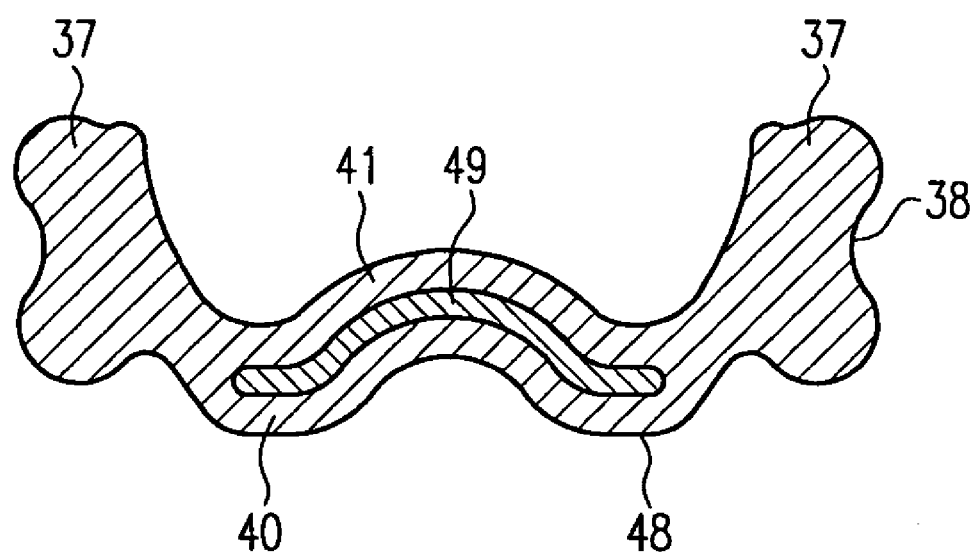
FIG. 21 is a section view of a further embodiment of a sealing device.

FIG. 21 shows in a section view a further embodiment of a sealing device 48 which differs from the sealing devices as shown in the FIGS. 18 to 20 in that provided between the lower layer 40 and the upper layer 41 is an inlay 49 which may be made of a material other than that of the sealing device 48 comprising, for example, an elastomer while, on the one hand, preventing the two layers 40, 41 from sticking together, and, on the other, ensuring that any damage to the lower layer 40 cannot propagate as a crack into the upper layer 41.

Figure 22:
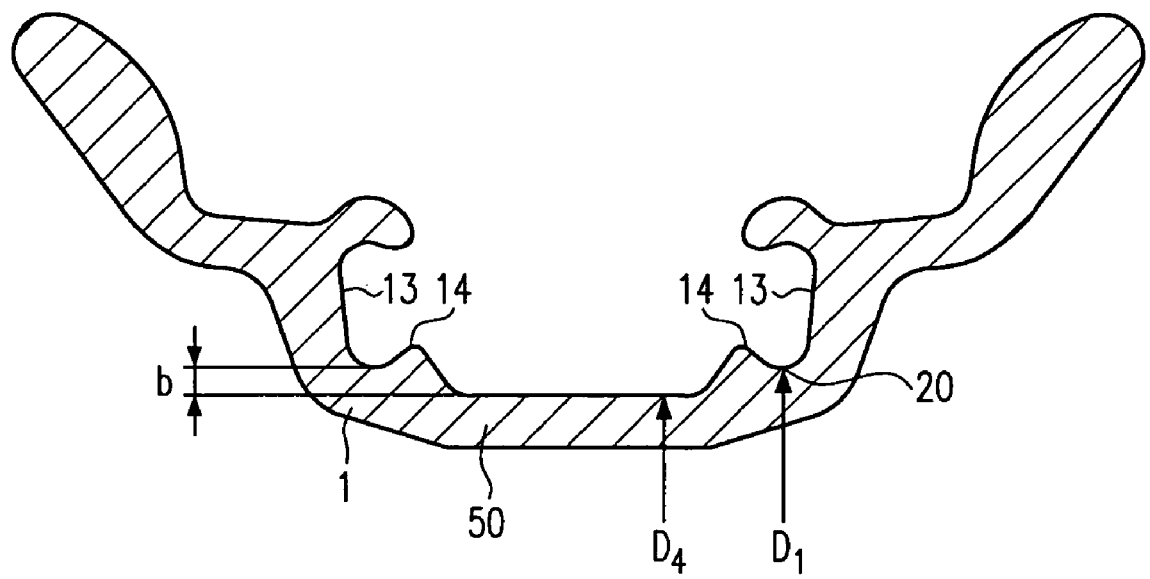
FIG. 22 is a section view of a further embodiment of a rim.

Referring now to FIG. 22 of the drawings, there is illustrated a section view of a further embodiment of a rim 1 in accordance with the present disclosure which differs from, for example, the rim 1 as shown in FIG. 1. In this embodiment, the rim 1 as shown in FIG. 22 has in the connecting portion 50 connecting the two reliefs 13 a smaller diameter $D_4$ than the diameter $D_1$ of the lower end portions 20 of the constrictions 14. This difference in diameter results in a spacing "b" which compensates the additionally height "b" of the sealing device 36, 44, 46, 48 (see FIGS. 18 to 21) due to the multilayer structure of the middle portion 39.

Figure 23:
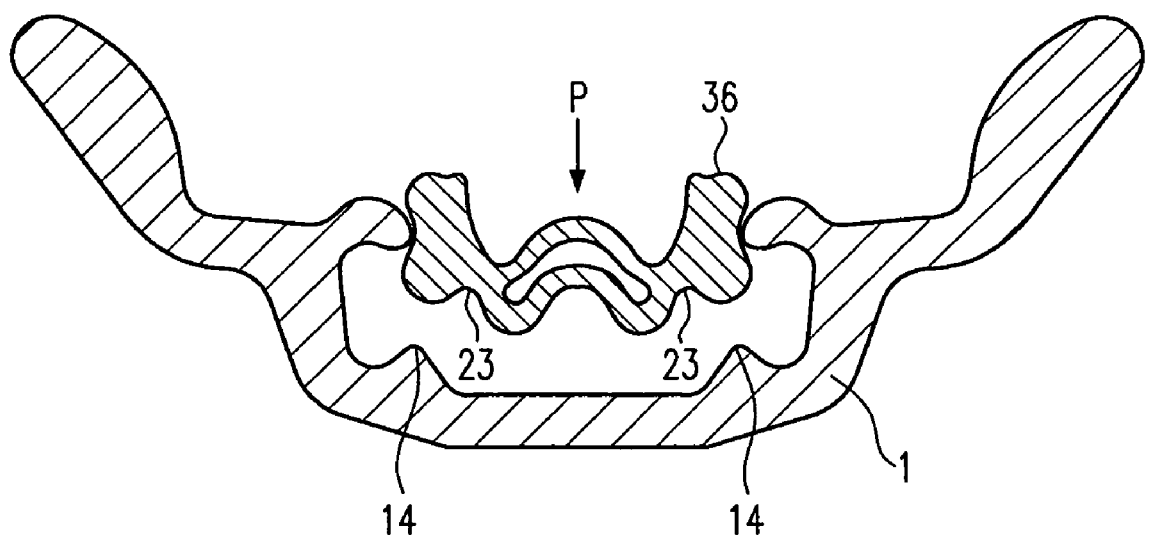
FIGS. 23 and 24 are section views assisting in explaining the sequence in fitting the sealing device to the rim.
Figure 24:
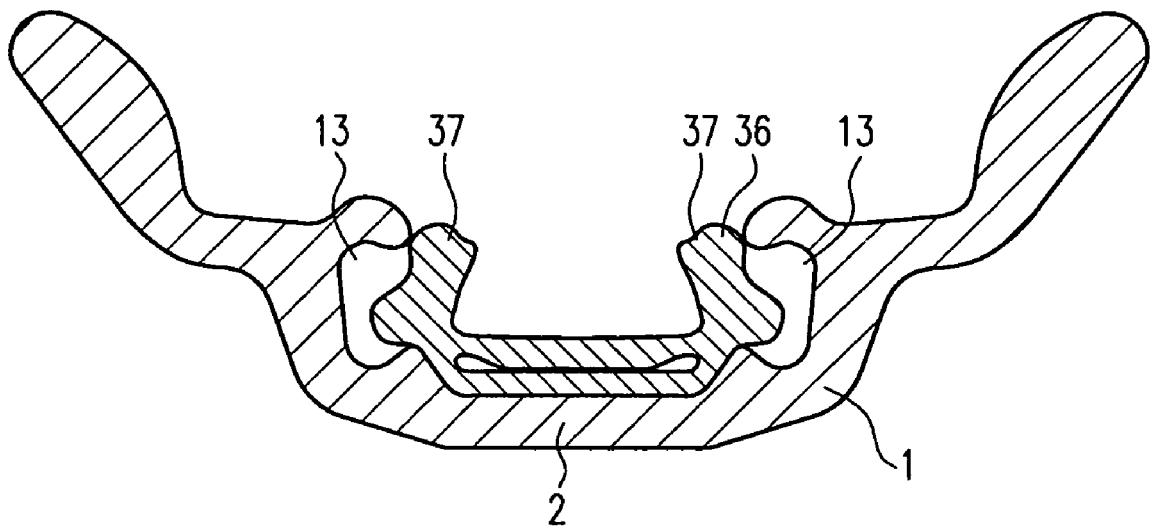
Figure 25:
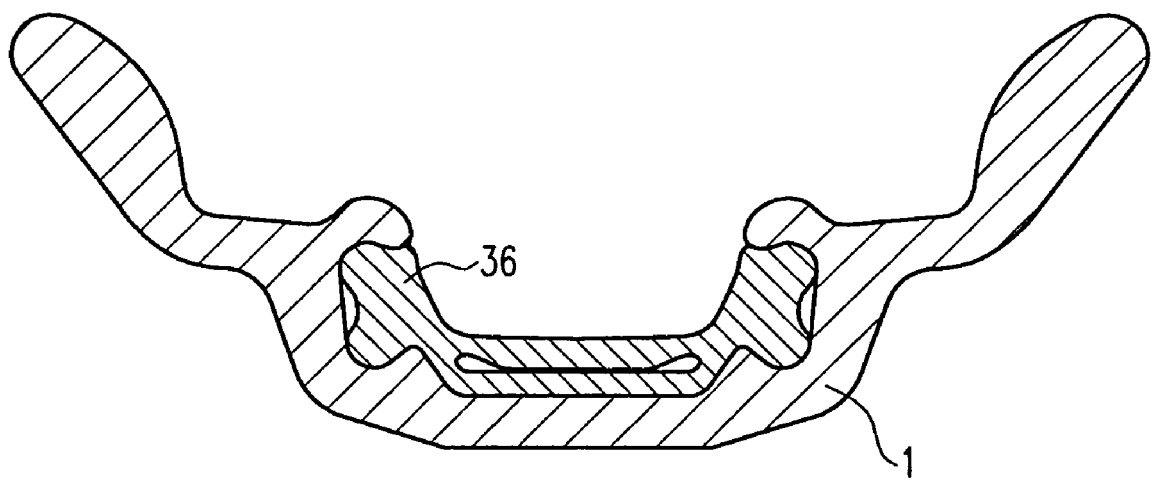
FIG. 25 is a section view of the rim with the sealing device fitted in place.

FIGS. 23, 24 and 25 show in conclusion the sequence of individual steps suggested to fit the sealing device 36 in the rim 1 as shown in FIG. 22. Although only the sealing device 36 is shown in FIGS. 23, 24 and 25, the further embodiments of the sealing device 12, 25, 27, 44, 46, 48 can be fitted to the rim 1 in a similar way.

Referring now to FIG. 23, there is illustrated the first step in the sequence of fitting the sealing device 36 to the rim 1. The sealing device 36 is squeezed in the direction of the arrow F (FIG. 18) so that the width of the sealing device 36 is reduced to pass through the gap formed by the two constrictions 14'. In this position the sealing device 36 is not yet in contact by its facing portion 23 with the lower constriction 14 of the relief 13. When force is then applied to the sealing device further in the direction of the arrow P (FIG. 23) it assumes the position as shown in FIG. 24 for mounting in which the portion 23 is already in contact with the constriction 14 and the middle portion 39 of the sealing device 36 already rests on the rim bed 2. Application of further force in the direction of the arrow F (FIG. 18) causes the two wings 37 of the sealing device 36 to slide into each relief 13 to thus attain the final position of the fitted sealing device 36 on the rim 1.

Then, simply mounting the tire 4 on the thus completed rim 1 finishes assembly of the wheel.

Sealing device and rim can be fabricated separate from each other and simply assembled together as shown in FIGS. 23, 24 and 25 to form the fully assembled spoke wheel rim fitted with the sealing device for mounting a tubeless tire.

With the rim and the sealing device combined, it is possible due to the relief in the rim that the sealing device can be simply and easily inserted in the relief on fitting. The resulting configuration is compatible with the use of conventional tubeless tires without the tires needing to be specially configured for use with the rim in accordance with the present disclosure. When the tubeless tire is mounted on the rim, the sealing device is not in direct contact with the bead of the tire, so that any movement of the tire relative to the rim no avoids deflation of the tire. Indeed, even when riding the tire with a low inflation pressure, for example to achieve better traction by a wide footprint of the tire on a loose surface, bottoming of the tire—for instance after a jump—with a motorcycle or bicycle fitted with the rim in accordance with the present disclosure in combination with a tubeless tire no longer results in tire leakage, since no tube susceptible to damage is involved.

Due to its configuration complementary in shape and size relative to the relief of the rim the sealing device nests seamless in the relief, so that the sealing device becomes a component of the rim bed, resulting in the rim contour as needed for tire fitting.

The sealing areas in the region of the relief can be provided so that they mainly act radially. The relief and the sealing device can be configured so that the contact pressure between sealing device and the sealing areas of the rim in the region of radially outlying sealing areas increases with increased angular velocity of rotation of the rim. This is obtained even when riding a tire at low inflation pressure, and there is no longer any deflation from the tire even at high speeds of the motorcycle or bicycle fitted therewith.

In this arrangement, two portions constricting the rim's relief are configured on both sides of the rim. Due to the configuration of the sealing device complementary in shape and size to the relief, a localized high contact pressure can now materialize in the region of the relief even when, for example, the tubeless tire moves relative to the rim. Now, even under unfavorable riding conditions, resulting in high loading of the tubeless tire fitted to the rim, it is assured that there is no deflation, in thus avoiding a drop in the inflation pressure of the tire, for example, under off-road sports competition conditions even when a very low inflation pressure is intentionally provided coupled with high angular velocity of rotation of the rim.

It is provided for that sealing areas 52, 54 are arranged at the relief 13 configured on both sides of the center plane 10 of the rim 1, in both the radially inward 52 and radially outlying 54 portions of the relief. See FIG. 8. These sealing areas 52, 54 are configured by means of a constriction 14, 14' configured in the region of each relief 13 so that sealing areas 52, 54 materialize on each relief substantially radially opposite each other. A plane passing through these sealing areas forms an angle in a range of approximately zero to 120 degrees with the center plane of the rim in accordance with the present disclosure, meaning, in other words, that the plane covering the sealing areas can run parallel to the center plane of the rim—corresponding to an angle of zero degrees—or assume any angle up to approximately 120 degrees to the center plane of the rim. Also the sealing area plane may cover any angle down to 20 degrees with the center plane of the rim. This allows a high freedom of design in configuring the rim, i.e., a high degree of freedom in designing the rim bed and the transition from the rim bed to the rim flange and portions in-between such as, for example, a hump. It is provided in this disclosure that the relief is configured such that it substantially completely encloses the sealing device in portions facing away from the center plane of the rim. This results in the sealing device being enclosed and particularly clasped by the relief so that even with high angular velocity of rotation of the wheel and low inflation pressures slippage of the sealing device out of place from the relief is now avoided in thus preventing any unintentional deflation of the tire.

In this arrangement, the sealing device can be configured so that it covers the portion of the rim bed between the reliefs provided on both sides of the center plane of the rim in thus nesting complementary in shape and size in the reliefs provided on both sides of the center plane of the rim and thereby totally covering the rim bed.

In accordance with the present disclosure, the sealing device can be configured so that when removed from the rim, it features a profile slightly different to that of the rim. When the sealing device is fitted on the rim, a predetermined contact pressure materializes at least in the region of the sealing areas and sealing device, so that—after fitting the tire to the rim with the sealing device—before the tire is inflated via a valve, a seal already materializes in the region of the sealing areas, in other words, even when the tire is still fully deflated. This achieves no loss of inflation pressure even on commencement of inflating the wheel and tire respectively.

In this arrangement, the sealing device in accordance with the present disclosure may be configured so that it has in the portion assigned to the relief a configuration similar to a parallelogram cross-sectionally with depressions provided in the region of the relief constrictions. The configuration of the sealing device relative to the relief can be selected in this arrangement so that when fitting the sealing device to the rim, there is a change in shape of the sealing device relative to the configuration of the rim bed and reliefs. As a result, a predetermined contact pressure materializes between the sealing device and the relief over the full extent of the relief, but at least in the region of the sealing areas between the sealing device and the sealing areas at the relief.

For this purpose, the sealing device in the non-fitted condition may be higher at the portion to be assigned to the relief than the corresponding relief as viewed in the radial direction of the rim. When the sealing device is applied to the portion of the relief a localized high contact pressure materializes at least in the region of the sealing area, resulting in leakage being prevented under all riding conditions once the tire is mounted on the rim.

It is furthermore provided for that the sealing device in the non-fitted condition has in the radial direction of the rim a smaller diameter than the rim, so that the sealing device can expand on being fitted to the rim. Because the cross-sectional width of the sealing device in the non-fitted condition in the portion of the relief to be assigned to the constriction is larger than the cross-sectional width of the constriction of the relief, the aforementioned increase in diameter of the sealing device does not result in the portion of the sealing device to be assigned to the reliefs being pulled out of the reliefs on being fitted to the rim.

In one embodiment of the invention, the sealing device may be provided with at least one circumferential sealing lip in the portion to be assigned to the constriction of the relief, so that in the region of the constriction an even higher local contact pressure materializes between the sealing device and the relief of the rim.

To facilitate fitting the sealing device to the rim, i.e., locating the sealing device in the reliefs provided in the portion on both sides of the center plane of the rim, the sealing device can be provided with at least one constriction oriented substantially transversely to the center plane of the rim, so that the portion of the sealing device located first in the reliefs when fitting the sealing device to the rim is temporarily squashed locally, facilitating locating the sealing device in the reliefs.

In addition, it is provided for in accordance with the disclosure that the rim features in the portion connecting the bed to the flange of the rim a substantially continuous outer contour so that the rim can be simply cleaned with no problem. Apart from this, the rim may be configured in the portion connecting the bed to the flange of the rim as a hollow chamber profile so that because of the continuous configuration of the outer contour in this portion no unfavorable mass distribution increasing the rotational moment of inertia of the rim can materialize.

The rim bed may have a diameter in the portion connecting the reliefs provided on both sides of the center plane of the rim which is smaller than the diameter of the lower end portion of the lower constrictions, meaning, in other words, that the rim in the region of the rim bed contacting the sealing device between the two reliefs has a smaller diameter than in the region of the two constrictions, so that a sealing device can be fitted which in the region of its two side wings serving to be received in the two reliefs, has a larger diameter in the lower portion of the wing than the portion of the sealing device between the two wings serving fitting in the rim bed.

At least in a segment covering the rim bed, the sealing device may also be configured with at least two layers, each of which may be the same or different in thickness. The lower layer located nearer to the rim bed then has the function to protect the upper layer oriented for example spaced away from the lower layer from ingress of a spoke nipple or spoke ends protruding beyond the spoke nipple. As compared to a one-piece thick layer, such a configuration has the advantage that any damage to the sealing device due to a sharp edged nipple or protruding spoke ends cannot be propagated as a tear up into the upper layer. Apart from this, configuring the sealing device, for example, with two such layers has the advantage of resulting in enhanced facility in fitting the sealing device to the rim, because it is easier to compress two layers of the sealing device oriented spaced away from each other widthwise on fitting than a sealing device having just a single thick layer to the portion at which the sealing device contacts the rim bed.

Between the individual layers of the sealing device a gap may be provided ensuring in fabrication of the sealing device that the individual layers do not stick together so that the advantages of the multilayer configuration of the sealing device are maintained.

It may also be that between the individual layers of the sealing device at least one web configured integrally with the layers is provided which connects the layers to a segment while maintaining the aforementioned gap. Such a configuration ensures that the gap between, for example, two layers of the sealing device is maintained in preventing the upper and lower layers from sticking together over a large area in fabrication of the sealing device in thus maintaining the advantages of the at least two layer sealing device. Also a tear materializing beyond this web, for example in the lower layer due to a spoke nipple or a sharp edged protruding spoke end, cannot be propagated up to the region of the second layer in thus preventing deflation of the tire.

In another aspect of this disclosure, at least one lug configured integrally with at least one layer of the sealing device and extending in the direction of the other layer may be provided, i.e. connected to only one layer and extending to the other layer or remaining spaced away therefrom. Such a configuration results in the advantage that piling the two layers of the sealing device can only produce a linear contact, the lug additionally also preventing upper and lower layer of the sealing device from sticking together over a large area in fabrication in thus maintaining the advantages of the at least two layer configuration. In addition, any tear materializing, for instance, in the lower layer because of a spoke nipple or sharp edged spoke end protruding beyond the lug cannot be propagated in the direction of the second layer.

In still another aspect, an inlay may also be provided in the gap between the at least two layers of the sealing device located loose or connected to at least one of the layers in thus creating an additional protection against damage to the sealing device down to the air space of the tire due to a spoke nipple or a sharp edged spoke end.

It is also provided for in accordance with this disclosure that the sealing device in the non-fitted condition features in the region of the center plane of the rim, in other words there where the sealing device comes into contact with the rim bed, a contour in a departure from a linear extent, more particularly configured curved. This achieves that at least one layer of the sealing device projects from a linear extent and the, for instance, curved configuration facilitating fitting the sealing device to the rim, since the width of the sealing device can be simply reduced by compression, making for no problem in nesting the sealing device into its location on the rim as provided for.

As already mentioned above, in the region of its two side wings in the lower end portion of the wings the sealing device may, as viewed radially from an axis of rotation of the rim, have a larger diameter than at the portion at which the sealing device covers the rim bed, since in this way the sealing device cannot tilt sideways out of place when being fitted to the rim while automatically locating into place. This spacing too, materializing from the difference in diameters, results in compensation of the higher profile of the sealing device due to the at least two-layer configuration in the middle portion between the two wings in thus maintaining the rim bed contour as specified, for instance.

In sum, it is also provided for in accordance with this disclosure that the sealing device includes a valve vulcanized in place for inflating the tubeless tire fitted to the rim. Since the sealing device fitted to the rim is not influenced by any twist in the tire relative to the rim, because there is no bodily contact between the tubeless tire and the sealing device, there is no risk of the valve being torn out of place as is possible with spoked rims fitted with a tube. Thus the rim with the sealing device permits eliminating a tube and lends itself to fitting with tubeless tires. In addition, by means of the rim and the sealing device, deflation even at low inflation pressure and in high speed riding is avoided even under high loading, for example, under off-road sports competition conditions. There is no risk of the valve being torn out of place as with tubed tires, i.e. the risk of a flat because of the tube is totally avoided. Apart from this, with the rim of this disclosure featuring the sealing device the handling agility of a vehicle fitted therewith is significantly enhanced because of the reduced rotational moment of inertia of the tire as compared to cast rims or tubed spoked rims. The relief of the rim and the sealing device are configured so that the contact pressure existing locally between the sealing areas and the sealing device increase with increasing angular velocity of rotation of the spoked rim with tubeless tires in accordance with the invention.

The disclosed apparatuses provide for a rim of a spoke wheel for tubeless tires wherein the rim has on both sides of a center plane of the rim a relief with sealing areas, and the rim is provided for a sealing device intended for fitting in the region of a rim bed in a well in the rim and the relief featuring two constrictions forming the sealing areas. The sealing device can be located in the bed of the rim so that the constrictions provided at the reliefs come into contact with the sealing device with such a bias that the air space of the tubeless tire is hermetically sealed.

In a cross-sectional view of the rim in this arrangement, a plane covering the sealing areas forms an angle in a range of approximately 0 to 120 degree with the center plane of the rim, whereby on both sides of the center plane of the rim in the region of the relief a sealing area may be configured radially outlying and a sealing area located radially further inlying, so that due to the thus configured relief the sealing device provided for locating in the region of the relief is substantially totally enclosed in the portion facing away from the center plane of the rim. This configuration enables the sealing device to be fitted so that it is urged into the relief with increasing contact force with increasing angular velocity of rotation of the rim in thus increasing the contact force existing in the region of between the sealing areas of rim and sealing device.

In this arrangement, the rim may be configured so that it has a substantially continuous, particularly linear, outer contour in the region of the connection between the rim bed and the rim flange while being configured as a hollow chamber profile to reduce the rotational masses in this region.

There thus is disclosed a sealing device for a rim of a spoke wheel with a tubeless tire, the sealing device being provided for fitting in the region of a rim bed in a well in the rim, and the rim having sealing areas in the region on both sides of rim center plane in a relief. The sealing device is configured substantially complementary in shape and size to the relief of the rim, such that the sealing device comprises in a portion to be included in the relief two depressions provided for fitting on constrictions of the relief.

Quite generally, the sealing device is configured so that when arranged in the region of the relief of the rim a sealing effect materializes between the sealing device and the sealing areas of the relief even when the rim is stationary and without force being applied by the inflation pressure of the tire. When a wheel provided with both a tubeless tire and the sealing device is caused to rotate, the contact pressure between the sealing device and the sealing areas of the rim increases in the region of the radially outlying located sealing area with increasing angular velocity of rotation.

The sealing device also is configured so that it can cover the portion of the rim bed between the reliefs provided on both sides of the center plane of the rim. For this purpose, it may be configured in the portion facing the relief similar cross-sectionally to a parallelogram with depressions provided in the region of constrictions of the relief in the rim.

To facilitate fitting the sealing device in the region of the relief in the rim, the sealing device may feature a constriction which flexes on application of the sealing device in the region of the relief in the rim to thus facilitate accommodating the sealing device in the relief of the rim.

From the foregoing disclosure, there is provided a rim with a sealing device for forming a spoke wheel with a tubeless tire. There also is provided a rim for a sealing device to form a spoke wheel with a tubeless tire and a sealing device intended for use with the rim in accordance with the disclosure. The invention thus now makes it possible to eliminate use of a tube with a spoke wheel and permits fitting conventional tubeless tires to a spoked rim. Because of the reduced rotational masses, the rim as presented with the sealing device significantly enhances the handling agility of a vehicle fitted therewith, for example a motorcycle or a bicycle. The rim with the sealing device is stiffer than known rims as employed, for example, in off-road sports events or also in road racing or other fields of application. Fitting tubeless tires makes for a huge gain in safety since the risk of a flat from deflation of the tube is now eliminated. Shearing off of valves vulcanized to the tube as is often observed with tube tires is completely avoided by having eliminated the need of a tube. The rim in accordance with the present disclosure, with the sealing device amounted, permits riding a tubeless tire on a lightweight spoked rim at low inflation pressure so that the traction achieved by the tubeless tire on, for example, a loose surface can now be significantly increased. Even at high angular velocities of rotation, the rim with the sealing device and the resulting high speed of, for example, a motorcycle fitted therewith, deflation of the inner space between spoke and sealing device as well as tubeless tire is now safely avoided.

Regarding individual features not explained in detail, reference is made otherwise to the claims and the drawing.

What is claimed is:

1. A rim apparatus for a spoked wheel for tubeless tires, comprising:
    a sealing device arranged in the region of a rim bed in a well of a wheel rim, said rim having a pair of rim flanges, a diameter and an imaginary rim center plane, and said rim comprising on both sides of said center plane a relief with sealing areas, said relief comprising two constrictions forming a radially outlying sealing area and a radially inward sealing area; and
wherein said sealing device is configured substantially complementary in shape and size to said relief and is arranged therein.

2. The apparatus as set forth in claim 1 wherein said relief and said sealing device are configured so a contact pressure between said sealing device and said outlying sealing area increases with increased angular velocity of rotation of said rim.

3. The apparatus as set forth in claim 1 wherein in a rim cross-section an imaginary plane covering said sealing areas defines an angle with said rim center plane of between approximately 0 degrees and approximately 120 degrees.

4. The apparatus as set forth in claim 1 wherein said sealing device comprises portions facing away from said rim center plane, and said relief is configured to substantially enclose said portions facing away from said rim center plane.

5. The apparatus as set forth in claim 1 wherein said sealing device covers a portion of said rim bed between said reliefs on both sides of said rim center plane.

6. The apparatus as set forth in claim 1 wherein when said sealing device is fitted on said rim, a predetermined contact pressure materializes between said sealing areas and said sealing device.

7. The apparatus as set forth in claim 1 wherein said sealing device comprises a portion corresponding to said relief, said portion substantially comprising in cross-section a parallelogram having depressions adjacent said constrictions of said relief.

8. The apparatus as set forth in any claim 1 wherein said sealing device has a fitted condition and a non-fitted condition, and wherein in the non-fitted condition said sealing device comprises a portion corresponding to said relief, said sealing device portion being higher than the height of said relief as viewed in the radial direction of said rim.

9. The apparatus as set forth in claim 8 wherein said sealing device in the non-fitted condition comprises, in the radial direction of said rim, a diameter smaller than said diameter of said rim.

10. The apparatus as set forth in claim 8 wherein in the non-fitted condition said sealing device comprises a constriction portion assignable to said constriction of said relief, and said constriction portion comprises a cross-sectional width larger than a cross-sectional width of said constriction of said relief.

11. The apparatus as set forth in claim 10 wherein said sealing device comprises at least one circumferential sealing lip in said constriction portion assignable to said constriction of said relief.

12. The apparatus as set forth in claim 1 wherein said sealing device comprises at least one constriction oriented substantially transversely to said rim center plane.

13. The apparatus as set forth in claim 1 wherein said rim comprises a portion connecting said rim bed to a respective rim flange, said connecting portion comprising a substantially continuous outer contour.

14. The apparatus as set forth in claim 13 wherein said connecting portion of said rim comprises a hollow chamber profile.

15. The apparatus as set forth in claim 1 wherein said constrictions comprise lower end portions defining a first diameter, and said rim bed comprises, in a portion of said bed connecting said reliefs, a second diameter smaller than said first diameter of said lower end portions.

16. The apparatus as set forth in claim 1 wherein said sealing device further comprises a valve vulcanized in place for inflating a tubeless tire fitted to said rim.

17. The apparatus as set forth in claim 1 wherein said sealing device comprises a portion covering said rim bed, and further wherein at least a part of said rim bed covering portion comprises at least two layers.

18. The apparatus as set forth in claim 17 wherein said layers are spaced away from each other to form a gap therebetween.

19. The apparatus as set forth in claim 17 further comprising at least one web between said layers, said web integrally connecting said layers while maintaining said gap.

20. The apparatus as set forth in claim 17 further comprising at least one lug configured integrally with at least one of said layers and extending toward the other of said layers.

21. The apparatus as set forth in claim 18 further comprising an inlay disposed in said gap.

22. The apparatus as set forth in claim 8 wherein in the non-fitted condition said sealing device comprises, in the vicinity of said imaginary rim center plane, a curved contour.

23. A rim apparatus for a spoked wheel for tubeless tires, comprising:
   a sealing device; and
   a rim comprising:
      an imaginary center plane; a pair of rim flanges;
      a well having a rim bed; and
      on both sides of said rim center plane, a relief with sealing areas contactable with said sealing device, said relief comprising two constrictions forming said sealing areas;
wherein said sealing device is disposable in said rim bed.

24. The apparatus as set forth in claim 23 wherein in a cross-sectional view of said rim, a plane covering said sealing areas forms an angle with said rim center plane of between approximately 0 degrees and approximately 120 degrees.

25. The apparatus as set forth in claim 23 wherein said sealing device comprises portions facing away from said rim center plane, and wherein said relief substantially encloses said portions facing away from said rim center plane.

26. The apparatus as set forth in claim 23 wherein said sealing device is fittable to said rim, and further wherein said rim in a radial direction comprises a diameter larger than a diameter of said sealing device.

27. The apparatus as set forth in claim 23 wherein said sealing device comprises a portion assignable to said constriction of said relief, and further wherein a cross-sectional width of said constriction is smaller than a cross-sectional width of said portion of said sealing device.

28. The apparatus as set forth in claim 23 wherein said rim comprises a portion connecting said rim bed to a respective rim flange, said connecting portion defining a substantially continuous outer contour.

29. The apparatus as set forth in claim 28 wherein said connecting portion of said rim comprises a hollow chamber profile.

30. The apparatus as set forth in claim 23 wherein said constrictions comprise lower end portions defining a first diameter, and said rim bed comprises, in a portion of said bed connecting said reliefs, a second diameter smaller than said first diameter of said lower end portions.

31. A sealing apparatus for a rim of a spoke wheel for receiving a tubeless tire, said sealing apparatus disposable in a region of a rim bed in a well of the rim, the rim having a pair of rim flanges, sealing areas and a relief in regions on each side of an imaginary rim center plane, said relief defined in part by constrictions in the rim, the rim also having a diameter, said sealing apparatus comprising:
   a configuration substantially complementary in shape and size to the relief of the rim; and
   a portion disposable into said relief and comprising depressions fittable on the constrictions of the relief.

32. The sealing apparatus of claim 31 wherein the relief comprises two constrictions forming a radially outlying sealing area and a radially inward sealing area, and further wherein with increasing angular velocity of rotation of the rim, a contact pressure increases between said sealing apparatus and the radially outlying sealing area.

33. The sealing apparatus of claim 32 wherein portions of said sealing apparatus facing away from the rim's imaginary center plane are substantially enclosable by the relief of the rim.

34. The sealing apparatus of claim 33 wherein said configuration comprises a portion covering the rim bed between the relief on both sides of the rim's imaginary center plane when said sealing apparatus is disposed on the rim.

35. The sealing apparatus of claim 34 wherein when said sealing apparatus is disposed on the rim, said configuration induces a predetermined contact pressure between the sealing areas and said sealing apparatus.

36. The sealing apparatus of claim 35 wherein said portions are assignable to said reliefs of the rim, said assignable portion being higher than the relief when viewed in the radial direction of the rim.

37. The sealing apparatus of claim 36 wherein said sealing apparatus has a fitted condition and a non-fitted condition, and wherein further when in said non-fitted condition said sealing apparatus comprises in the radial direction of the rim a smaller diameter than the diameter of the rim.

38. The sealing apparatus of claim 37, when in said non-fitted condition, wherein said relief-assignable portion comprises a cross-sectional width larger than a cross-sectional width of the constriction of the relief.

39. The sealing apparatus of claim 37 further comprising at least one circumferential sealing lip in each said portion to be assigned to the constriction of the relief.

40. The sealing apparatus of claim 37 further comprising at least one constriction oriented substantially transversely to the rim's imaginary center plane.

41. The sealing apparatus of claim 37 further comprising a valve vulcanized in place for inflating the tubeless tire.

42. The sealing apparatus of claim 34 wherein at least in a part of said configuration portion covering said rim bed comprises at least two layers.

43. The sealing apparatus of claim 42 wherein said layers are spaced away from each other to form a gap there-between.

44. The sealing apparatus of claim 43 further comprising at least one web integrally connecting said layers while maintaining said gap.

45. The sealing apparatus of claim 43 further comprising at least one lug integral with at least one of said layers and extending in the direction of the other of said layers.

46. The sealing apparatus of claim 43 further comprising an inlay in said gap.

47. The sealing apparatus of claim 37, when in said non-fitted condition, further comprising a curved contour in the vicinity of the rim's imaginary center plane.

* * * * *